US011009163B2

(12) United States Patent
Lotfi et al.

(10) Patent No.: US 11,009,163 B2
(45) Date of Patent: May 18, 2021

(54) FIELD REPLACEABLE FLUID ELEMENT METHODS AND SYSTEMS FOR FLUIDIC PROCESSORS

(71) Applicant: Condair Humidity Ltd., Ottawa (CA)

(72) Inventors: Shahram Lotfi, Orleans (CA); Dmitry Elman, Ottawa (CA)

(73) Assignee: Condair Ltd., Ontario (CA)

( * ) Notice: Subject to any disclaimer, the term of this patent is extended or adjusted under 35 U.S.C. 154(b) by 166 days.

(21) Appl. No.: 16/044,711

(22) Filed: Jul. 25, 2018

(65) Prior Publication Data

US 2019/0032827 A1 Jan. 31, 2019

Related U.S. Application Data

(60) Provisional application No. 62/536,537, filed on Jul. 25, 2017.

(51) Int. Cl.
| | |
|---|---|
| *B01D 35/02* | (2006.01) |
| *B01D 29/96* | (2006.01) |
| *F16L 37/08* | (2006.01) |
| *F24F 6/18* | (2006.01) |
| *F24F 6/02* | (2006.01) |

(52) U.S. Cl.
CPC ............. *F16L 37/08* (2013.01); *B01D 29/96* (2013.01); *B01D 35/02* (2013.01); *F24F 6/025* (2013.01); *F24F 6/18* (2013.01); *B01D 2201/40* (2013.01)

(58) Field of Classification Search
CPC ...... F24F 6/02; F24F 6/025; F24F 6/18; F24F 11/0008; F24F 11/30; F24F 11/39; F16L 37/08; B01D 2201/40; B01D 2201/4007; B01D 2201/4023; B01D 2201/4046; B01D 2201/4061; B01D 2201/4076; B01D 29/00; B01D 29/11; B01D 29/114; B01D 29/117; B01D 29/13; B01D 29/15; B01D 29/23; B01D 29/31; B01D 29/33; B01D 29/35; B01D 29/96; B01D 29/965; B01D 35/02; B01D 35/12; B01D 35/30; B01D 35/306; B01D 27/00; B01D 27/08; B01D 27/10; B01D 27/103; B01D 27/108

See application file for complete search history.

(56) References Cited

U.S. PATENT DOCUMENTS

| 5,298,158 A * | 3/1994 | Anderson | B01D 35/12 |
| | | | 210/167.04 |
| 5,359,692 A * | 10/1994 | Alix | B64D 13/00 |
| | | | 219/517 |
| 5,397,462 A * | 3/1995 | Higashijima | B01D 35/04 |
| | | | 210/136 |

(Continued)

*Primary Examiner* — David C Mellon
(74) *Attorney, Agent, or Firm* — Akerman LLP

(57) ABSTRACT

Steam cylinders for humidifiers require periodic replacement as well as replacement to address failures etc. However, field replacement of steam cylinders is not a straightforward operation and there is significant risk and potential for damage to the replacement cylinder and the humidifier as fluidic seals for the water inlet and steam outlet must be unmade as well as electrical connections for heater elements, level sensors etc. Accordingly, embodiments of the invention provide solutions for the deployment of replacement cylinders etc. for domestic, retail, and commercial systems that reduce the likelihood of damage to the fluidic seals, electrical connectors etc.

6 Claims, 20 Drawing Sheets

(56) References Cited

U.S. PATENT DOCUMENTS

| | | | | |
|---|---|---|---|---|
| 5,770,064 | A * | 6/1998 | Jonsson | A61M 1/1652 |
| | | | | 210/232 |
| 6,280,300 | B1 * | 8/2001 | Komatsu | B01D 35/12 |
| | | | | 451/87 |
| 6,843,912 | B2 * | 1/2005 | Chaney | B01D 35/157 |
| | | | | 210/234 |
| 8,097,158 | B2 * | 1/2012 | Tubby | C02F 9/005 |
| | | | | 210/235 |
| 2003/0102257 | A1 * | 6/2003 | Reid | B01D 35/303 |
| | | | | 210/232 |
| 2019/0191595 | A1 * | 6/2019 | Nachefski | G05B 15/00 |

* cited by examiner

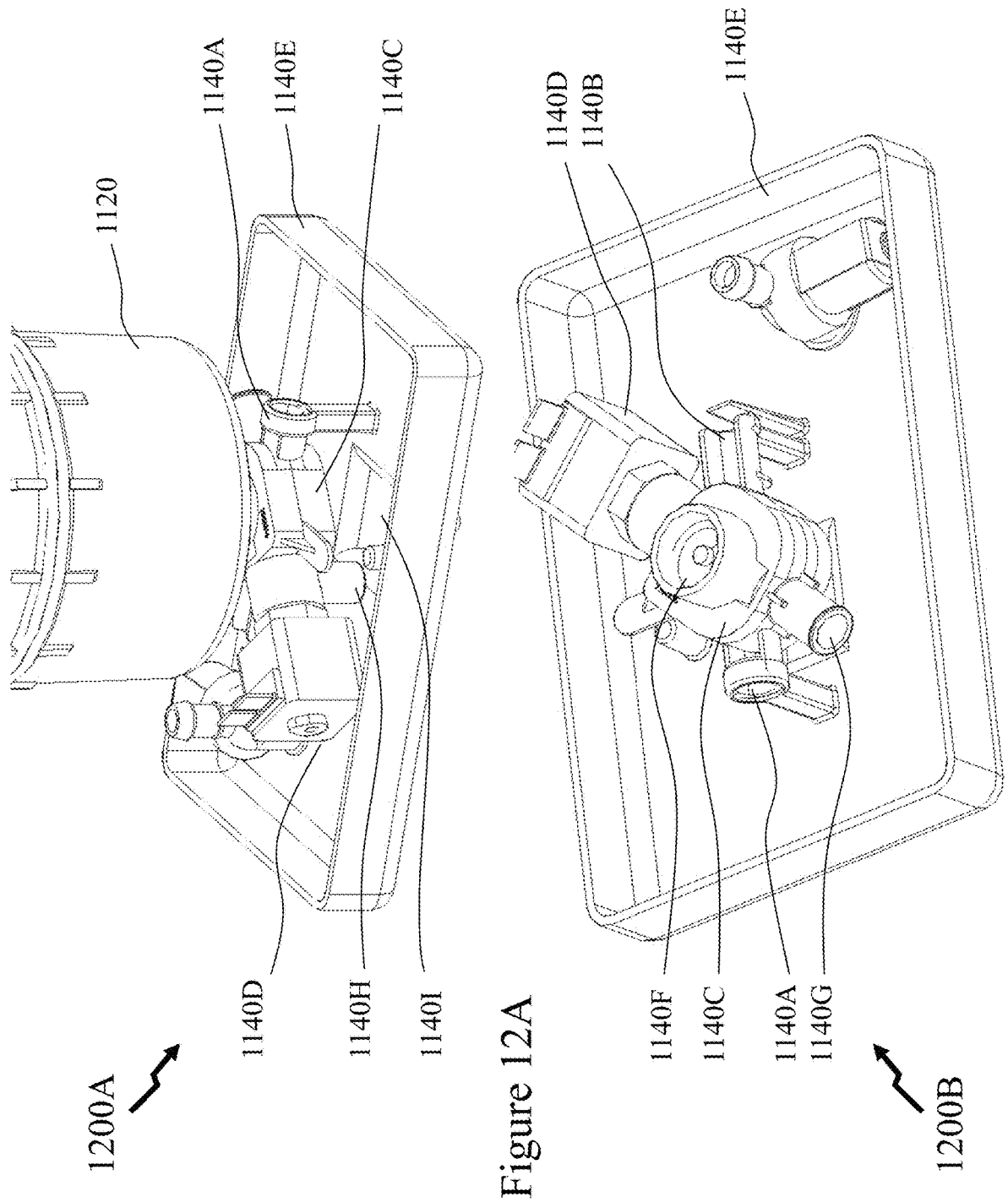

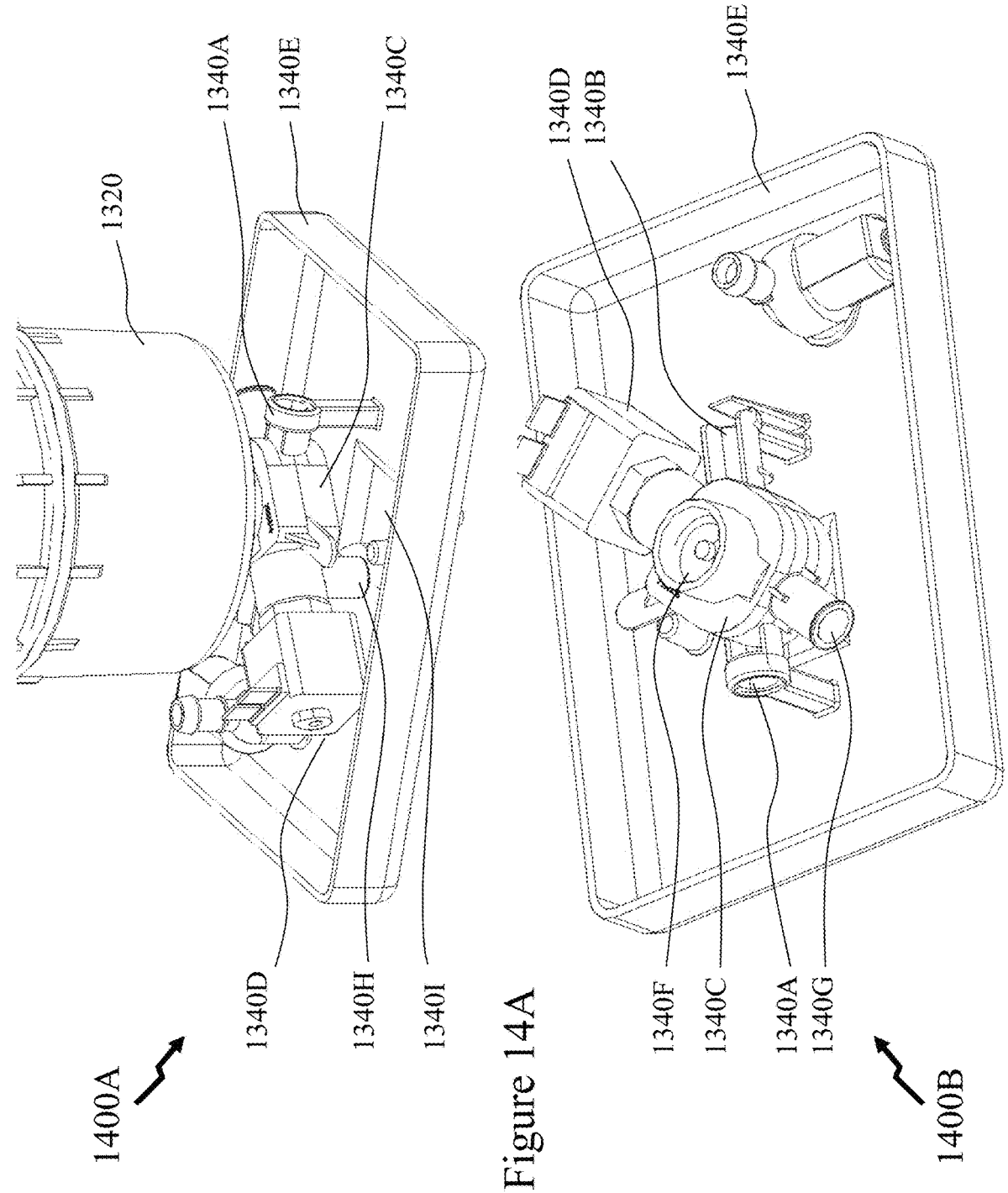

FIELD REPLACEABLE FLUID ELEMENT METHODS AND SYSTEMS FOR FLUIDIC PROCESSORS

CROSS-REFERENCE TO RELATED APPLICATIONS

This patent application claims the benefit of U.S. Provisional Patent Application 62/536,537 filed on Jul. 25, 2017 entitled "Field Replaceable Fluid Element Methods and Systems for Fluidic Processors", the entire contents of which is incorporated herein by reference.

FIELD OF THE INVENTION

This invention relates to fluidic elements for fluidic processors and more particularly to the design and implementation of field replaceable fluidic elements for fluidic processors such as electrode humidifier cylinders for humidifiers.

BACKGROUND OF THE INVENTION

A humidifier is a device that increases humidity (moisture) in a single room or an entire building. Point-of-use humidifiers are commonly used to humidify a single room, while whole-house or furnace humidifiers, which connect to a building's home's heating, ventilation and air conditioning (HVAC) system, provide humidity to the building. Large humidifiers are used in commercial, institutional, or industrial contexts, often as part of a large HVAC system.

The need for humidifiers arises in low humidity environments which may occur in hot, dry desert climates, or indoors in artificially heated spaces. In winter, especially when cold outside air is heated indoors, the humidity may drop as low as 10-20%. This low humidity can cause adverse health effects for humans and animals within these environments either as workers, visitors, or residents. Industrial humidifiers may also be used when a specific humidity level must be maintained to achieve specific requirements such as preventing static electricity buildup or preserving material properties (e.g. art galleries, museums, libraries, and their associated storage). Whilst evaporative humidifiers, natural humidifiers, vapourizing humidifiers, impeller humidifiers and ultrasonic humidifiers are all common types, it is the vapourizing humidifier (or vapourizer, steam humidifier, warm mist humidifier) that dominates the industry for most commercial humidification systems.

In operation, a vapourizing humidifier comprises a water tank that is at least partially filled with water, creating a water reservoir and a vapour region above the water reservoir within water tank. Heat for heating the water within the water tank is provided by a means such as from an electrical immersion heater or mains voltage electrodes immersed in the water on smaller domestic units or a heat exchanger transferring heat from hot combustion gases of oil or gas in larger commercial units. The water vapour, or steam, forms within water tank in the vapour region above the water reservoir. This vapour region is fluidly connected to a steam tube or steam nozzle that passes through the upper region of the water tank.

However, humidification systems historically were associated with time-consuming and costly maintenance required to remove the minerals typically left behind when water is boiled. Operators require a humidifier that can create clean steam and sustain long-term efficient operation. Accordingly, over forty years the applicant established electrode based humidifiers with a disposable cylinder to meet client expectations. As clean steam is produced, the in-steam cylinder minerals are removed in intervals and through an automatic drain system. The Applicant's patented auto-adaptive control system is designed to produce rated output capacity until the very end of a functioning cylinder life is reached. Once a cylinder is no longer functioning it is effortlessly removed and replaced with a new powerful, clean cylinder. In many humidifiers complete disassembly is required for cleaning through the use of hazardous cleaning substances to fully remove the minerals. In the Applicant's designed humidifiers the cylinder is removed and replaced so that customer maintenance costs are reduced. Further, when the cylinders are produced of inert plastics and retain only the water borne minerals, disposal problems are minimal.

However, such field replacement of steam cylinders is still not a straight-forward operation and there is significant risk and potential for damage to the replacement cylinder and the humidifier as fluidic seals for the water inlet and steam outlet must be unmade and made for the old and new cylinder as well as electrical connections for heater elements, level sensors etc. Similar issues exist with other elements disposed within fluidic processing systems.

Accordingly, it would be beneficial to provide consumers and maintenance personnel with means to deploy replacement cylinders etc. for domestic, retail, and commercial systems that reduces the likelihood of damage to the fluidic seals, electrical connectors etc. which can at a minimum damage the replacement cylinder requiring that another replacement cylinder be acquired and deployed. Potentially, the damage is to the main unit's fluidic connections and/or electrical connections requiring that these be repaired or potentially a complete new system installed. Such damage thereby increasing downtime, costs, etc. as well as requiring maintenance personnel.

It would be beneficial for embodiments of the invention to operate not only with water/steam but with other materials that are evaporated for subsequent transfer in gaseous state and employed within a range of applications within the medical, chemical, environmental fields etc. It would be further beneficial for embodiments of the invention to work with cylinders/cartridges etc. other than humidifiers such as filters, etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address fluidic elements for fluidic processors and more particularly to the design and implementation of field replaceable fluidic elements for fluidic processors such as electrode humidifier cylinders for humidifiers.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder.

In accordance with an embodiment of the invention there is provided a device comprising:

a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
the first fluidic assembly comprises:
  a coupling for mating to the first fluid port; and
  a mounting for coupling the first fluidic assembly to a support within a system of which the cylinder forms part; wherein
  the mounting and support allow the first fluidic assembly to tilt such that at least one of the first fluidic assembly can be titled away from the system to allow the cylinder to be removed from the system or the first fluidic assembly can be tilted towards the system after a cylinder has been mounted to the first fluidic assembly for installation to the system.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
the first fluidic assembly comprises:
  a coupling for mating to the first fluid port; and
  a mounting for coupling the first fluidic assembly to a support within a system of which the cylinder forms part; wherein
  the mounting and support allow the first fluidic assembly to be moved and tilted such that at least one of the first fluidic assembly can be moved and titled away from the system to allow the cylinder to be removed from the system or the first fluidic assembly can be moved tilted towards the system after a cylinder has been mounted to the first fluidic assembly for installation to the system.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
the first fluidic assembly comprises:
  a third fluid port;
  a coupling;
  a mounting for coupling the first fluidic assembly to a support within a system of which the cylinder forms part; and
  a means for moving the coupling from a first position to a second position; wherein
  in the first position the coupling is lowered away from the cylinder allowing the cylinder to be inserted and removed from a system comprising the cylinder; and
  in the second position the coupling is raised providing a fluidic coupling between the first fluid port and the third fluid port.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
at least one of:
  the first fluidic assembly comprises:
    a third fluid port;
    a coupling;
    a mounting for coupling the first fluidic assembly to a support within a system of which the cylinder forms part; and
    a means for moving the coupling from a first position to a second position; wherein
    in the first position the coupling is lowered away from the cylinder allowing the cylinder to be inserted and removed from a system comprising the cylinder; and
    in the second position the coupling is raised providing a fluidic coupling between the first fluid port and the third fluid port; and
  the second fluidic assembly comprises:
    a fourth fluid port;
    a coupling;
    a mounting for coupling the second fluidic assembly to a support within a system of which the cylinder forms part; and
    a means for moving the coupling from a first position to a second position; wherein
    in the first position the coupling is raised away from the cylinder allowing the cylinder to be inserted and removed from a system comprising the cylinder; and
    in the second position the coupling is lowered providing a fluidic coupling between the first fluid port and the third fluid port.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
at least one of:
  removal of the cylinder from at least one of mating with at least one of the first fluidic assembly and the second fluidic assembly automatically disconnects at least one electrical connection of a plurality of electrical connections to the cylinder; and
  insertion of the cylinder to at least one of mating with at least one of the first fluidic assembly and the second fluidic assembly automatically connects at least one electrical connection of a plurality of electrical connections to the cylinder.

In accordance with an embodiment of the invention there is provided a device comprising:
a first fluidic assembly for coupling to a first fluid port of a replaceable cylinder for at least one of providing and receiving a first fluid to the cylinder; and
a second fluidic assembly for coupling to the second fluid port for receiving a second fluid from a second fluid port of the replaceable cylinder; wherein
  a system comprising the first fluidic assembly and the second fluidic assembly also comprises at least one fitting of a plurality of fittings, each fitting having a predetermined geometry matching a predetermined portion of the external geometry of the cylinder; and
  the at least one fitting of the plurality of fittings aligns at least one of the first fluid port of the replaceable cylinder with the first fluidic assembly and the second fluid port of the replaceable cylinder with the second fluidic assembly.

In accordance with an embodiment of the invention there is provided a device comprising a first fluidic assembly for coupling to a first fluid port of a replaceable cylinder for providing a first fluid to the cylinder.

In accordance with an embodiment of the invention there is provided a method of accessing a replaceable cylinder within a fluidic processing system comprising mounting the replaceable cylinder upon a first mount which allows the replaceable cylinder to be pivoted away from the system allowing a user to remove the cylinder without interference from a shell of the system by lifting it away from the first mount.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 11A to 12B depict a mechanism according to an embodiment of the invention for engaging and disengaging a cylinder within a fluidic system; and FIGS. 13A to 14B depict a mechanism according to an embodiment of the invention for engaging and disengaging a cylinder within a fluidic system.

DETAILED DESCRIPTION

Figure 1:
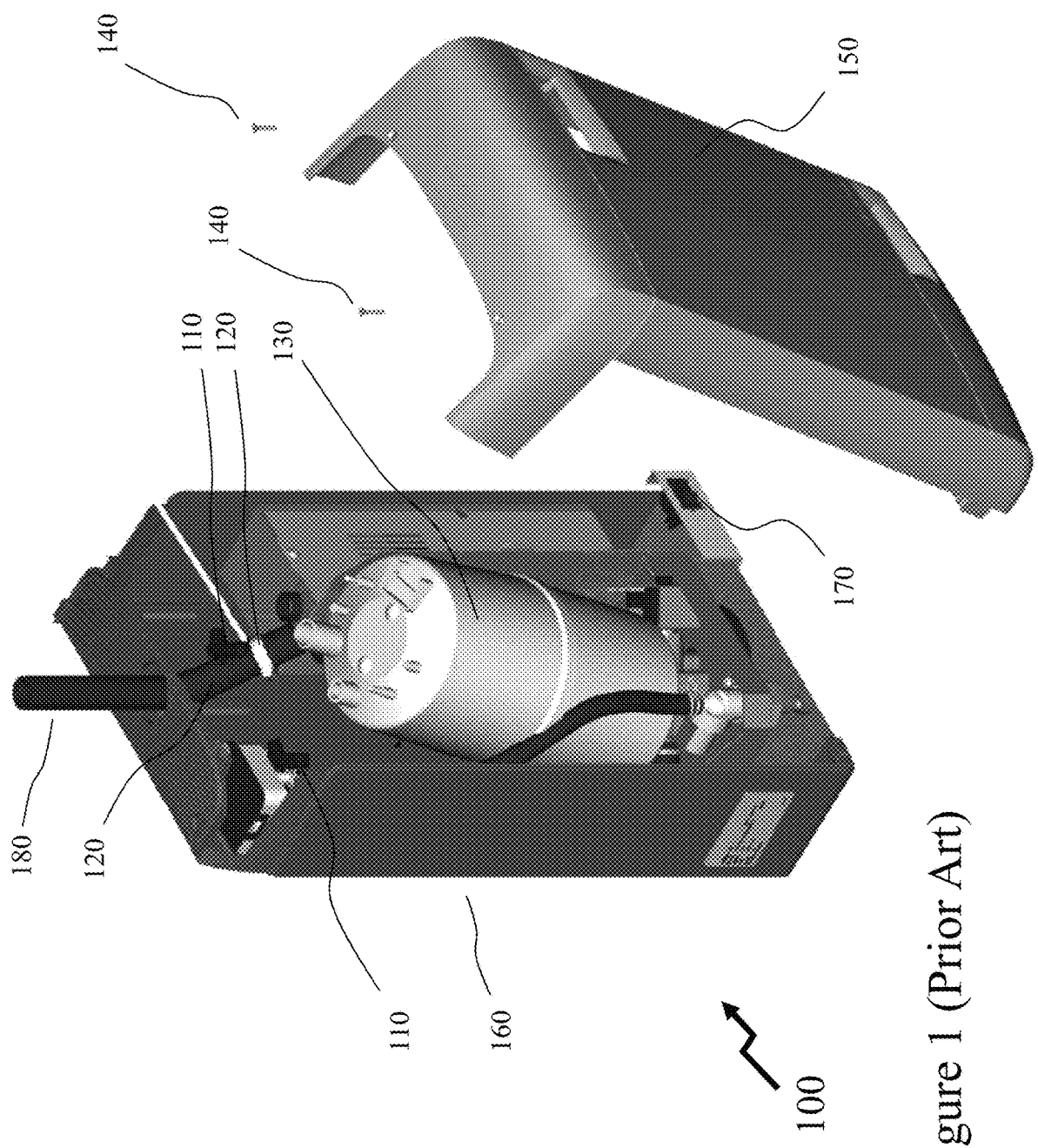
FIG. 1 depicts a humidifier with replaceable cylinder according to the prior art.

The present invention is directed to humidifiers and more particularly to the design and implementation of fluid carry-over barriers within steam nozzles.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "vapourizer" as used herein and throughout this disclosure, refers to a system designed to provide a source of a predetermined material or materials within the gaseous state. Accordingly, a vapourizer may include, but not be limited to, a humidifier for providing steam within an air conditioning application.

A "scaffold" or "scaffolds" as used herein, and throughout this disclosure, refers to a structure that is used to hold up, interface with, or support another material or element(s). This includes, but is not limited to, such two-dimensional (2D) structures such as substrates and films, three-dimensional (3D) structures such as geometrical objects, non-geometrical objects, combinations of geometrical and non-geometrical objects, naturally occurring structural configurations, and manmade structural configurations. A scaffold may be solid, hollow, and porous or a combination thereof. A scaffold may contain recesses, pores, openings, holes, vias, and channels or a combination thereof. A scaffold may be smooth, textured, have predetermined surface profiles and/or features. A scaffold may be intended to support one or more other materials, one or more elements, one or more structures etc. A scaffold may include, but not be limited to, a spine of a device and/or a framework, for example, which also supports elements disposed within the scaffold either partially or completely. A scaffold may include, for example, a ring around an opening of an upper portion of a humidifier cartridge body such that the wall of the humidifier cartridge body extends up and around from the ring and over enclosing the upper portion of the chamber. A scaffold may include, for example, a ring around an opening of a lower portion of a humidifier cartridge body such that the wall of the humidifier cartridge body extends down and around from the ring and enclosing the lower portion of the chamber.

A "plastic" as used herein, and throughout this disclosure, refers to a material consisting of any of a wide range of synthetic or semi-synthetic organic compounds that are malleable and can be molded. Plastics are typically organic polymers of high molecular mass, but may contain other substances. They are usually synthetic, most commonly derived from petrochemicals, but many are made from renewable materials. Accordingly a plastic may include, but not be limited to, polyester, polyethylene terephthalate, polyethylene, high-density polyethylene (HDPE), polyvinyl chloride (PVC), polyvinylidene chloride (PVDC), low-density polyethylene (LDPE), polypropylene (PP), polystyrene (PS), high impact polystyrene (HIPS), polyamides (PA), nylons, acrylonitrile butadiene styrene (ABS), polycarbonate (PC), polyurethanes (PU), maleimide/bismaleimide, melamine formaldehyde (MF), phenolics (PF) or (phenol formaldehydes), polyetheretherketone (PEEK), polyetherimide (PEI), polyimide, polymethyl methacrylate (PMMA), polytetrafluoroethylene (PTFE), and polysulfone. It would be evident that the plastics available for a specific application may be a subset of these as well as others not identified wherein the plastic may be specified based upon factors including, but not limited to, the required operating temperatures, chemical(s) vapourised, cost, and manufacturability.

A "polyester" as used herein, and throughout this disclosure, refers to a category of polymers that contain the ester functional group in their main chain. This includes, but is not limited to polyesters which are naturally occurring chemicals as well as synthetics through step-growth polymerization, for example. Polyesters may be biodegradable or not. Polyesters may be a thermoplastic or thermoset or resins cured by hardeners. Polyesters may be aliphatic, semi-aromatic or aromatic. Polyesters may include, but not be limited to, those exploiting polyglycolide, polylactic acid (PLA), polycaprolactone (PCL), polyhydroxyalkanoate (PHA), polyhydroxybutyrate (PHB), polyethylene adipate (PEA), polybutylene succinate (PBS), polyethylene terephthalate (PET), polybutylene terephthalate (PBT), polytrimethylene terephthalate (PTT), and polyethylene naphthalate (PEN).

A "thermoplastic" or "thermosoftening plastic" as used herein and throughout this disclosure, refers to a category of polymers that become pliable or moldable above a specific temperature and solidify upon cooling. Thermoplastics may include, but not be limited, polycarbonate (PC), polyether sulfone (PES), polyether ether ketone (PEEK), polyethylene (PE), polypropylene (PP), poly vinyl chloride (PVC), polytetrafluoroethylene (PTFE), polyimide (PI), polyphenylsulfone (PPSU), polychlorotrifluoroethene (PCTFE or PTFCE), florinated ethylene propylene (FEP), and perfluoroalkoxy alkane (PFA). It would be evident that the thermoplastics available for a specific application may be a subset of these as well as others not identified wherein the plastic may be specified based upon factors including, but not limited to, the required operating temperatures, chemical(s) vapourised, cost, and manufacturability.

A "plastic", "polyester" or "thermoplastic" as used herein may refer to the material in an unfilled or filled state, i.e. 100% material or X % material and (100−X) % filler. A filler may be a single material or a combination of materials. Examples of fillers may include, but not be limited to, graphite particles, glass particles, carbon particles/fibers, graphite particles/fibers, glass particles/fibers, quartz particles/fibers, boron particles/fibers, ceramic particles/fibers or whiskers such as alumina and silica, metal-coated particles/fibers, ceramic-coated particles/fibers, diamond-coated particles/fibers, carbon nanotubes, aramid particles/fibers such as Kevlar™, poly-phenylenebenzobisoxazole ("PEO") particles/fibers such as Zylon™, metal particles/fibers, polythenes, polyacrylates, liquid crystalline polymers, and aromatic polyesters such as Vectran™.

A "metal" as used herein, and throughout this disclosure, refers to a material that has good electrical and thermal conductivity. Such materials may be malleable and/or fusible and/or ductile. Metals may include, but not be limited to, aluminum, nickel, copper, cobalt, chromium, silver, gold, platinum, iron, zinc, titanium, and alloys thereof such as bronze, stainless steel, stainless steel, brass, and phosphor bronze. It would be evident that the metals and/or alloys available for a specific application may be a subset of these as well as others not identified wherein the plastic may be specified based upon factors including, but not limited to, the required operating temperatures, chemical(s) vapourised, cost, and manufacturability.

A "silicone" as used herein, and throughout this disclosure, refers to a polymer that includes any inert, synthetic compound made up of repeating units of siloxane.

An "elastomeric" material or "elastomer" as used herein, and throughout this disclosure, refers to a material, generally a polymer, with viscoelasticity. Elastomers may include, but not be limited to, unsaturated rubbers such as polyisoprene, butyl rubber, ethylene propylene rubber, silicone rubber, fluorosilicone rubber, fluoroelastomers, perfluoroelastomers, and thermoplastic elastomers.

The term "flexible," as used herein, refers to the ability of a body that is capable of being bent or flexed. Something that is flexible can be, for example, resilient or malleable. The term "resilient," as used herein, refers to the ability of a body that has been subjected to an external force to recover, or substantially recover, its original size and/or shape, following deformation. The term "malleable," as used herein, refers to the ability of a body that has been subjected to an external force to deform and maintain, or substantially maintain, the deformed size and/or shape.

Within the following descriptions in respect of FIGS. 1 to 8 embodiments of the invention are described with respect to steam humidification systems and FL-COBs for steam nozzles forming part of such systems. However, it would be evident that the concepts described and depicted may be applied to other vaporisation systems and vapours/fluids, e.g. vapours/fluids other than steam/water.

FIG. 1 depicts a humidifier 100 with replaceable cylinder 130 according to the prior art. As depicted the humidifier 100 comprises a front cover 150, shell 160, REplaceable HUmidifier Cylinder (REHUC) 130, CYlinder Plugs (CYPs) 110 for connection to REHUC 130 electrodes/ sensors etc., flexible hose 120 with hose clamp, drain and power switch 170, outlet pipe 180 and cover screws 140. In order to replace the REHUC 130 the user disconnects the electrical mains power at the external disconnect before any servicing. The inside of the humidifier cabinet 160 contains high voltage components and wiring. The existing cylinder is drained by switching the drain and power switch 170 to the ON or Drain position. Alternatively, draining of the cylinder may be performed automatically due to detection of a fault or expiration of the cylinder life.

Once the REHUC 130 is drained the user turns the drain and power switch 170 to the off position and then turns off the water supply at the shut off valve. Next the screws 140 securing the front cover 150 to the shell 160 are undone allowing the cover 150 to be removed. Next the cylinder plugs 110 are removed from the electrical contacts on the top of the REHUC 130.

Next, the hose clamp is undone allowing the flexible hose to be decoupled from the outlet pipe 180. The user can now remove the REHUC 130 by lifting/tipping the REHUC 130 out from the inlet water and/or drain connection (not shown). It is during this stage that the user can damage the inlet water connection of the humidifier as well as damage other electrical interfaces to the REHUC 130. Installation of the new REHUC 130 requires that the user inserts the bottom connection of the REHUC 130 into the inlet water and/or drain connection which is achieved by lifting/tilting the REHUC 130 and then positioning/dropping the REHUC 130. In order to ensure a fluidic seal an O-ring is typically employed which may be placed onto the lower inlet of the REHUC 130 to fit between the REHUC 130 inlet and the inlet water and/or drain connection or may be part of the inlet and/or drain connection assemblies. This O-ring may be supplied discretely with the REHUC 130 for the user to attach or the O-ring may be part of the drain valve system such that replacement is only required in the event of damage. The user then re-attaches the flexible hose to the outlet of the REHUC 130 and outlet pipe 180 once the REHUC 130 has been position and tightens the hose clamps. Next the cylinder plugs 110 are attached to the appropriate electrical contacts on the top of the REHUC 130.

At this point the user replaces the humidifier cover 150 and secures with the screw 140 before turning back on the electrical power at the external disconnect and turning the water shut off valve back on. Finally, the user turns the drain switch to on such that the REHUC 130 fills and the electrical heaters generate steam. In order to provide compact humidifiers, the manufacturer will typically make the shell 160 as small as possible relative to the REHUC 130. This coupled with the outlet pipe 180, electrical cabling, controller, power supply etc. lead to the available space for manipulating the REHUC 130 being minimal. Accordingly, damaging one or more of the inlet water and/or drain connection, bottom inlet of the REHUC 130, O-ring, and O-ring retaining groove is easy. Equally, visibility when inserting the REHUC 130 may be limited so that distortion/movement of the O-ring may not be evident until the REHUC 130 is inserted freeing the user to view or when the humidifier is re-started through a leaking connection.

Within some embodiments of the invention the inlet fluid may require a valve be closed. In other embodiments of the invention an inlet valve may default to closed position without any power.

Figure 2A:
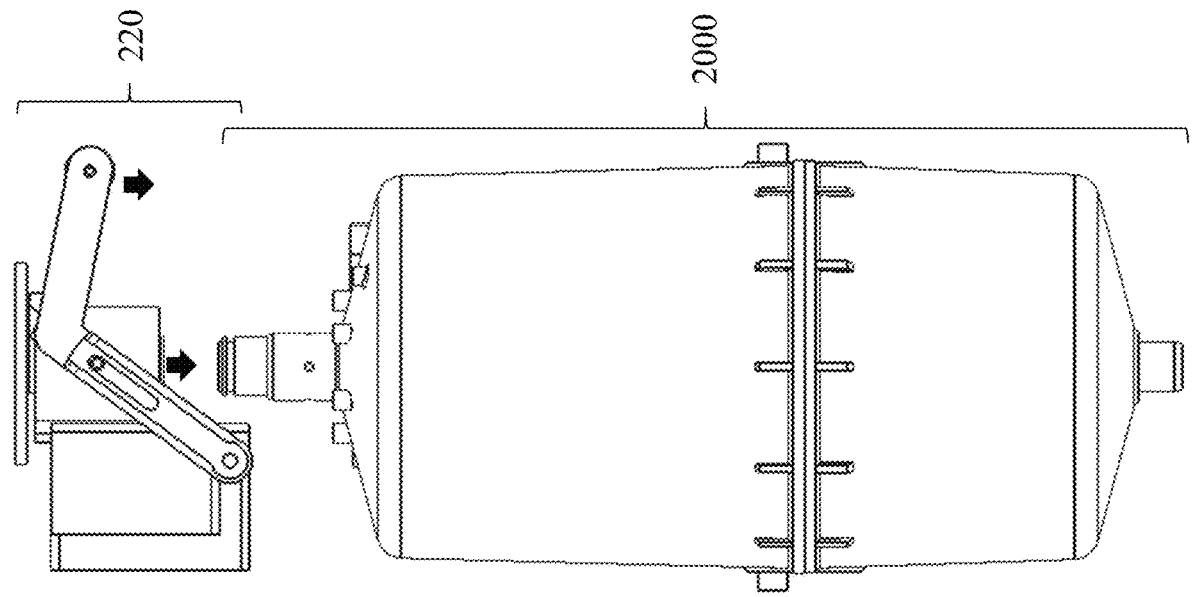
FIGS. 2A and 2B depict a mechanism according to an embodiment of the invention for engaging and disengaging a cylinder within a fluidic system.
Figure 2A:
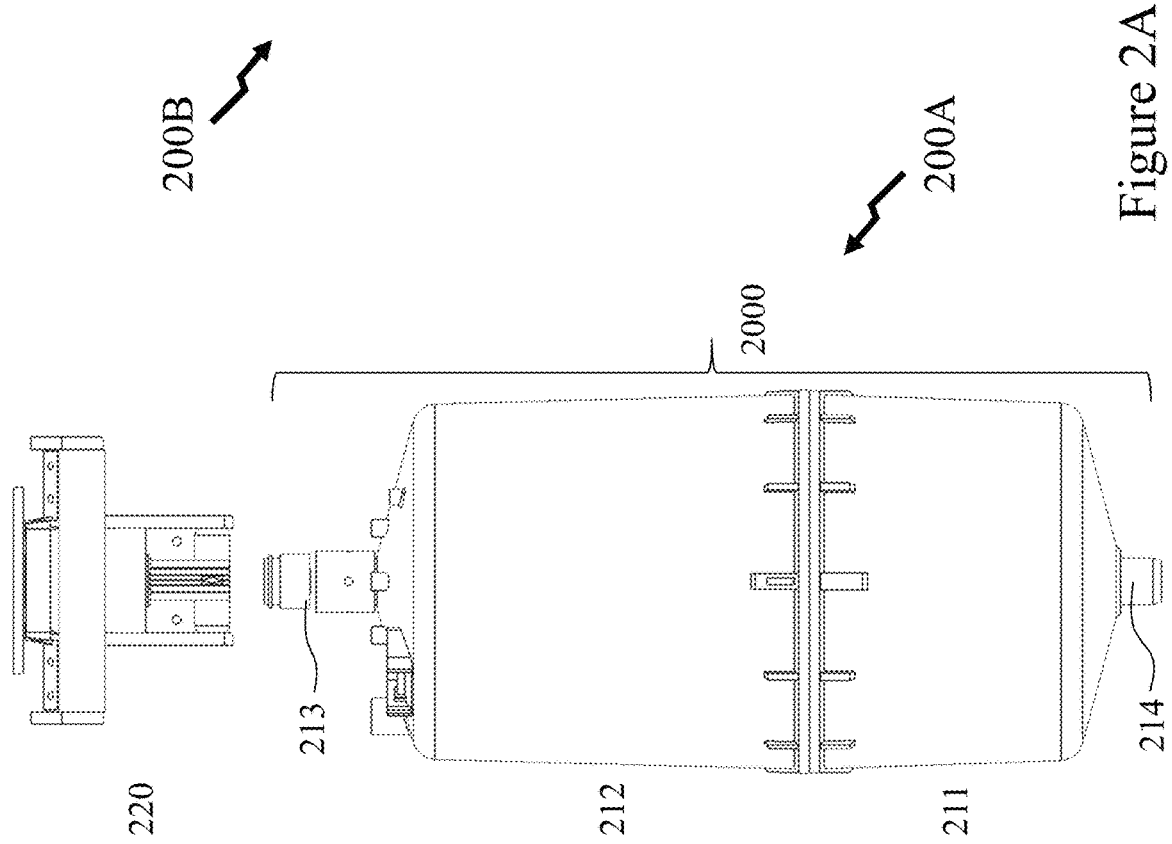
Figure 2B:
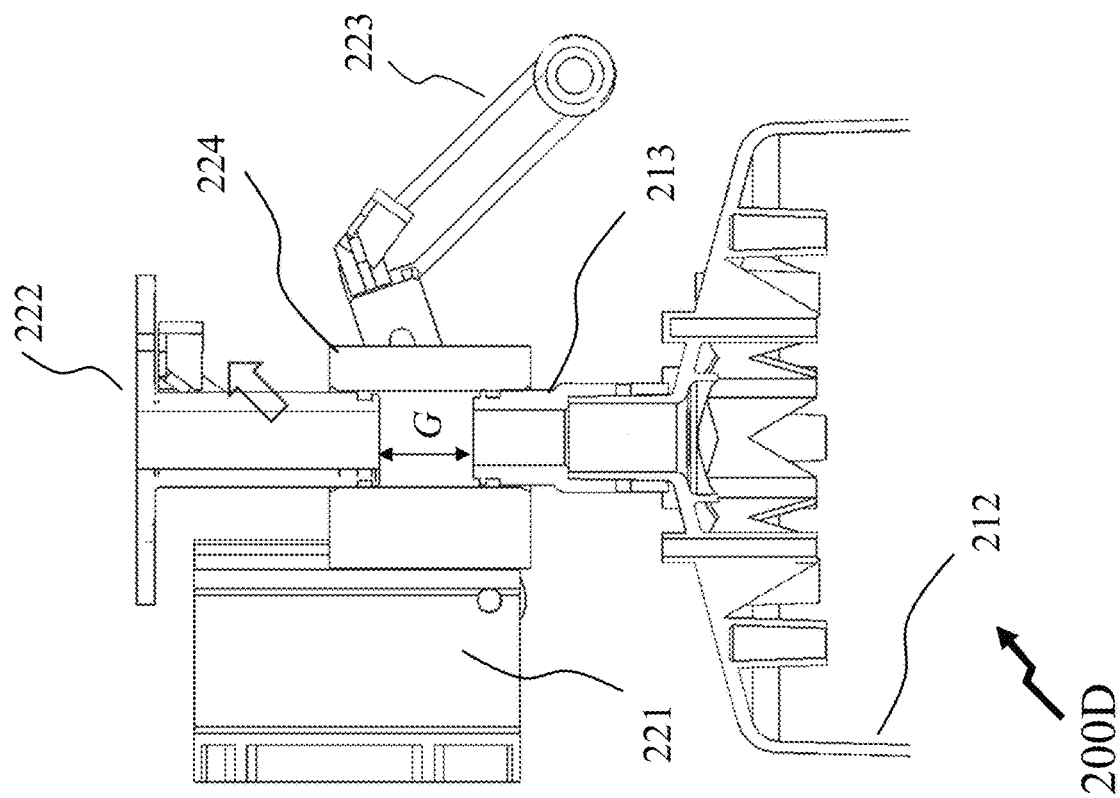
Figure 2B:
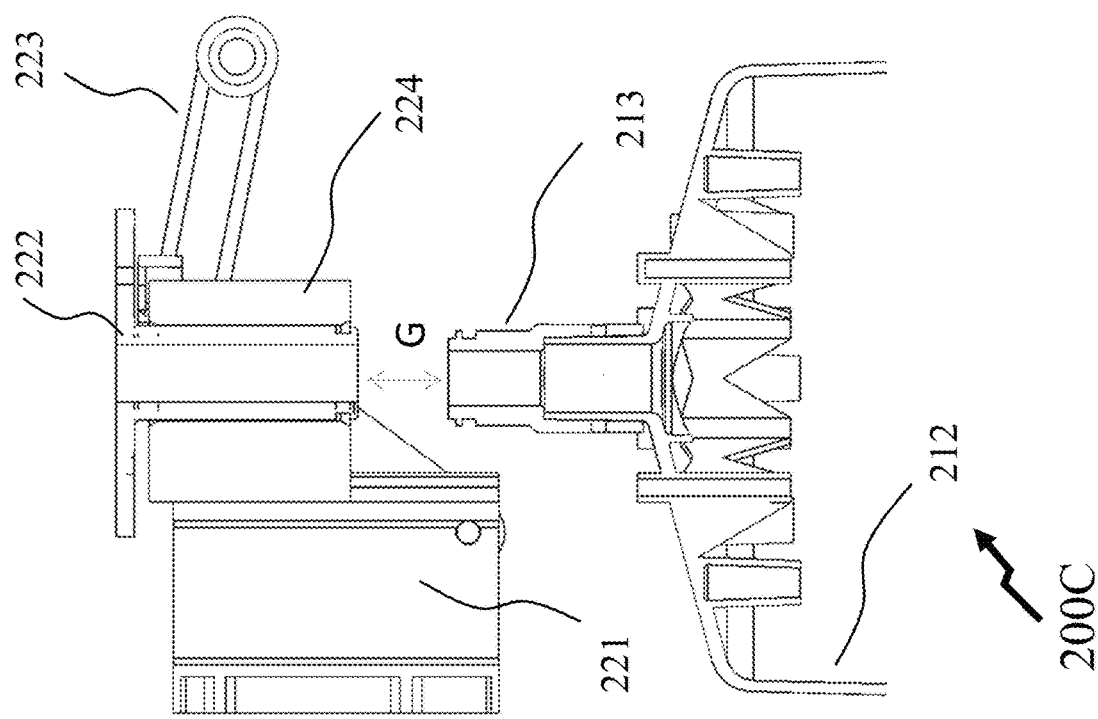

Referring to FIG. 2A there are depicted first to third views 200A to 200C of a mechanism according to an embodiment of the invention for engaging and disengaging a REHUC such as cylinder 2000 within a fluidic system. As depicted the cylinder 2000 comprises a lower portion 211 with inlet/drain connection 214 and upper portion 212 with steam outlet 213. Also depicted is a movable coupling assembly (MCA) 220 comprising a body 221, fluidic-mechanical coupling 222, handle 223 and movable sleeve 224. As evident in uncoupled image 300A and coupled image 300B the handle 223 raises/lowers the movable sleeve 224 relative to the body 221 and fluidic-mechanical coupling 222 together with the steam outlet 213 and upper portion 212 of cylinder 2000. Accordingly, the movable sleeve 224 allows for the coupling between the outlet portion of the humidifier (coupled via the fluidic-mechanical coupling 222) and the steam outlet 213 to be made/broken without requiring the cylinder 2000 be moved. Whilst a gap G is depicted within uncoupled image 200C and coupled image 200D in FIG. 2B it would be evident to one skilled in the art that this gap may be zero or a predetermined value. Optionally, the movable sleeve 224 may have a profile at the top allowing the steam outlet 213 of the cylinder 2000 to be slid into the moveable sleeve which is then raised to put the steam outlet 213 within the sealed joints between it and the movable sleeve 224 and the movable sleeve 224 and the fluidic-mechanical coupling 222.

Figure 3:
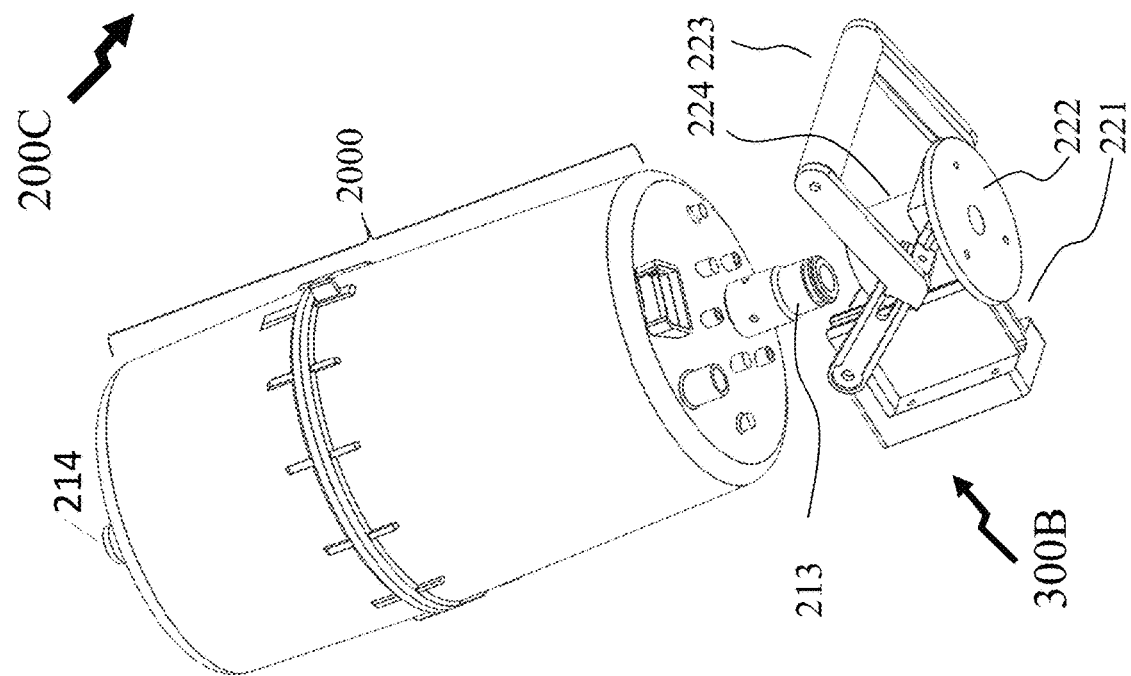
FIG. 3 depicts a mechanism according to the embodiment of the invention depicted in FIGS. 2A and 2B for engaging and disengaging a cylinder within a fluidic system at either end.
Figure 3:
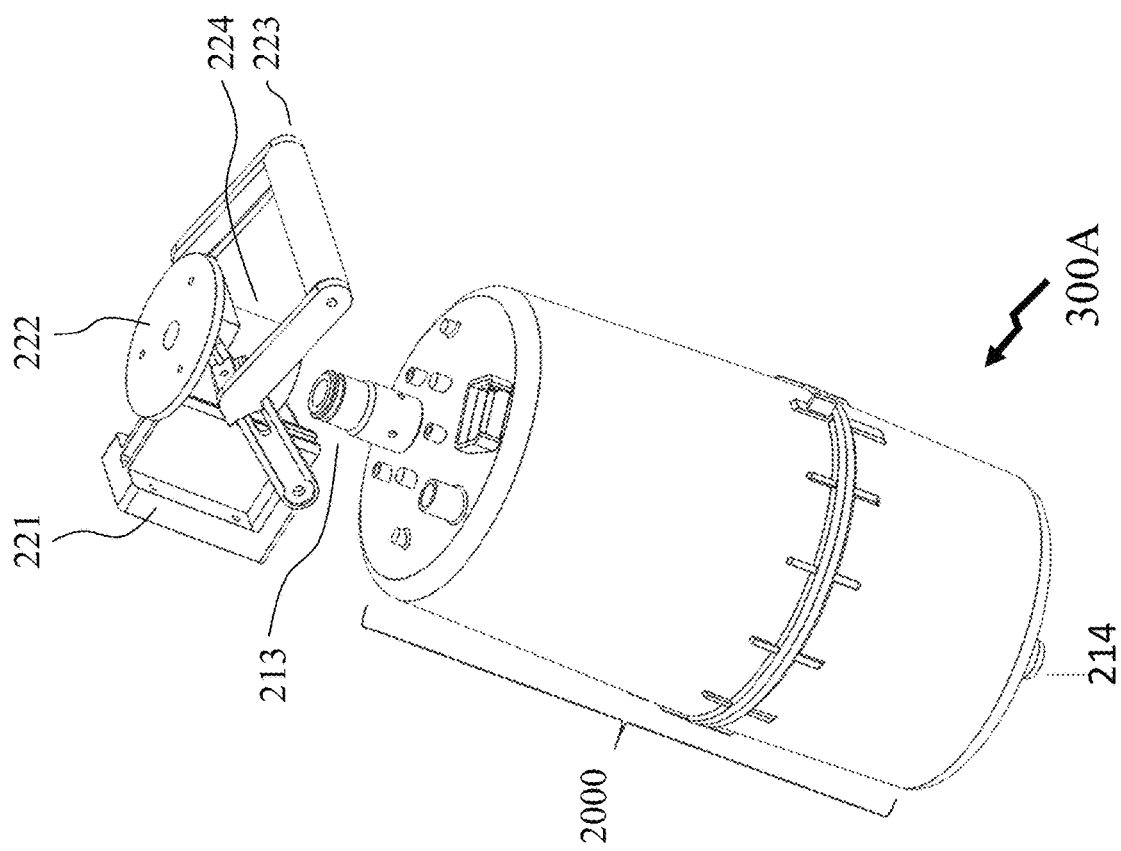

Now referring to FIG. 3 there are depicted first and second three-dimensional (3D) perspective images 300A and 300B. The movable coupling assembly (MCA) 220 is disposed at the top of the REHUC, such as cylinder 2000, as depicted in respect of FIGS. 2A and 2B, for engaging and disengaging with fluidic output port with the steam outlet 213 and at the bottom of the REHUC for engaging and disengaging with fluidic inlet/drain connection 214 according to embodiments of the invention. In the second configuration in second image 300B the REHUC, such as cylinder 2000, within the fluidic system is inserted into the fluidic system and installed with its weight pushing it down such that its inlet/drain connection 214 engages the fluidic inlet port of the fluidic system. The MCA 220 is then raised such that it engages the steam outlet 213. Beneficially, the embodiments of the invention depicted in FIGS. 2A to 3 provide a fluidic connection through pressure along the axis of the fluidic connection closing the joint rather requiring a radial pressure through a clamp or clamps applied to a hose or hoses fitting over the inlet and/or outlet.

Figure 4:
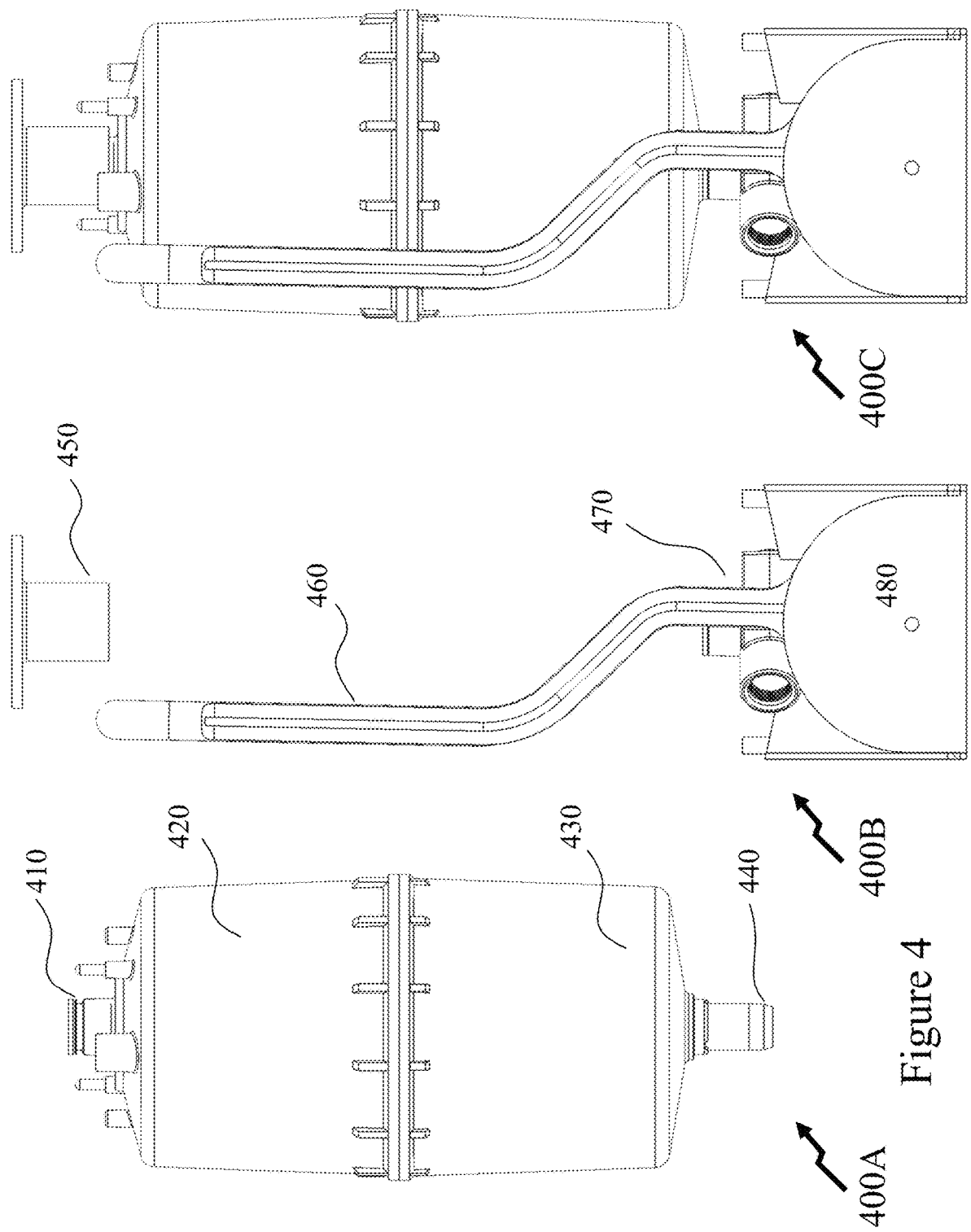
FIGS. 4 and 5 depict a mechanism according to an embodiment of the invention for engaging and disengaging a cylinder within a fluidic system.
Figure 5:
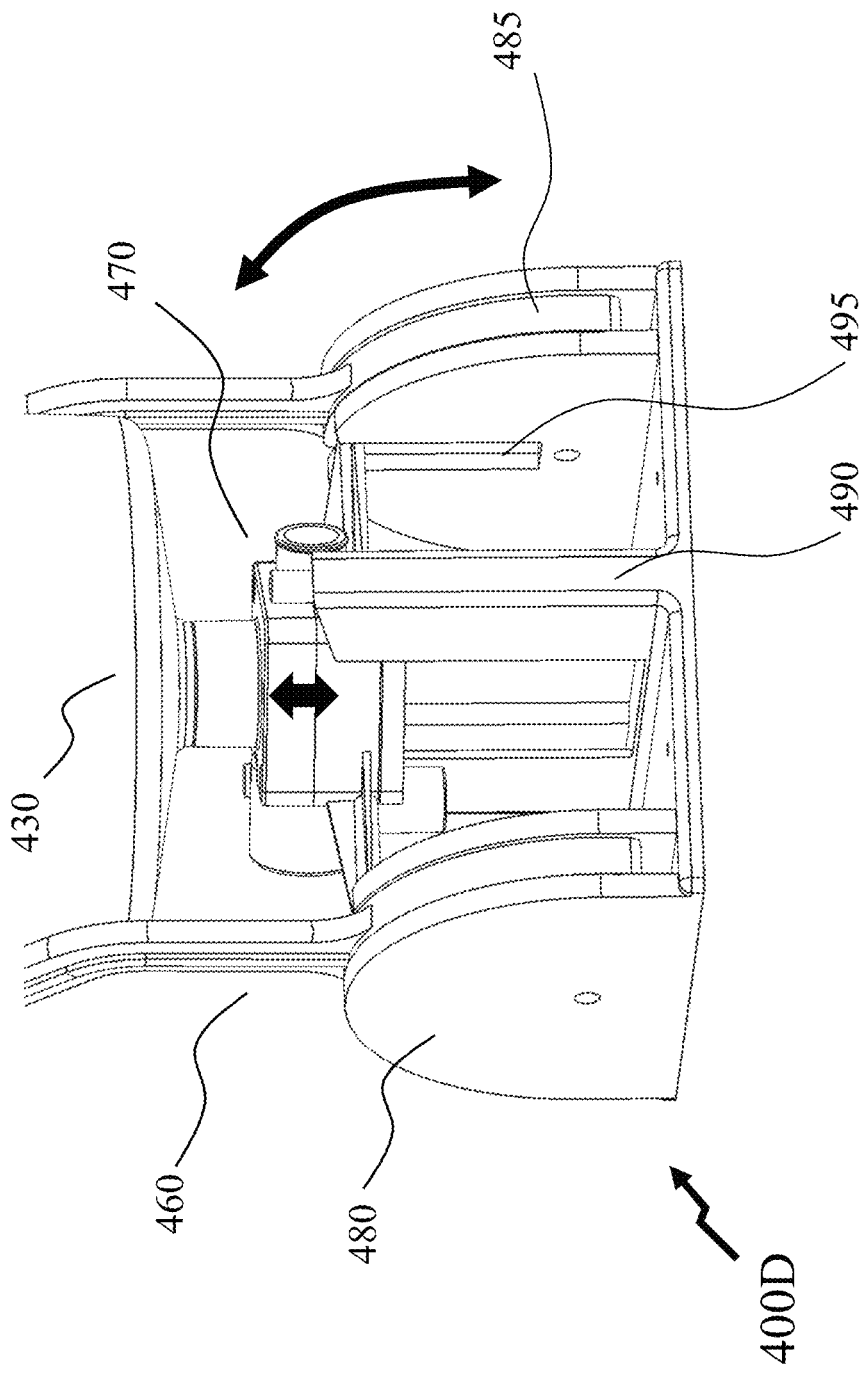

Within FIGS. 4 and 5 there are depicted first to fourth images 400A to 400D respectively for a mechanism according to an embodiment of the invention for engaging and disengaging a cylinder within a fluidic system. Accordingly, first image 400A depicts the REHUC cylinder comprising outlet 410, upper body portion 420, lower body portion 430 and inlet-drain 440. Second image 400B depicts the mechanism comprising outlet coupling 450, handle 460, inlet-drain assembly 470 and housing 480. Accordingly, the assembled cylinder-mechanism as configured when the REHUC is in use is depicted in third image 400C. Referring to FIG. 4D movement of the handle 460 results in cams 485 rotating and moving the inlet-drain assembly 470 vertically via guides 495 and frame elements 490 of housing 480. Accordingly, removal of the cylinder is accomplished by pulling the handle down thereby lowering the inlet-drain assembly 470 (and cylinder if decoupled at the upper end) wherein the cylinder can be lifted out vertically from the inlet-drain assembly 470 avoiding any tipping/tilting and forced removal of the old REHUC and/or insertion of the new REHUC. Once the new REHUC has its inlet-drain 440 inserted into the inlet-drain assembly 470 the handle can be raised thereby lifting the cylinder and inlet-drain assembly 470 back vertically allowing connection of the steam outlet.

Figure 6:
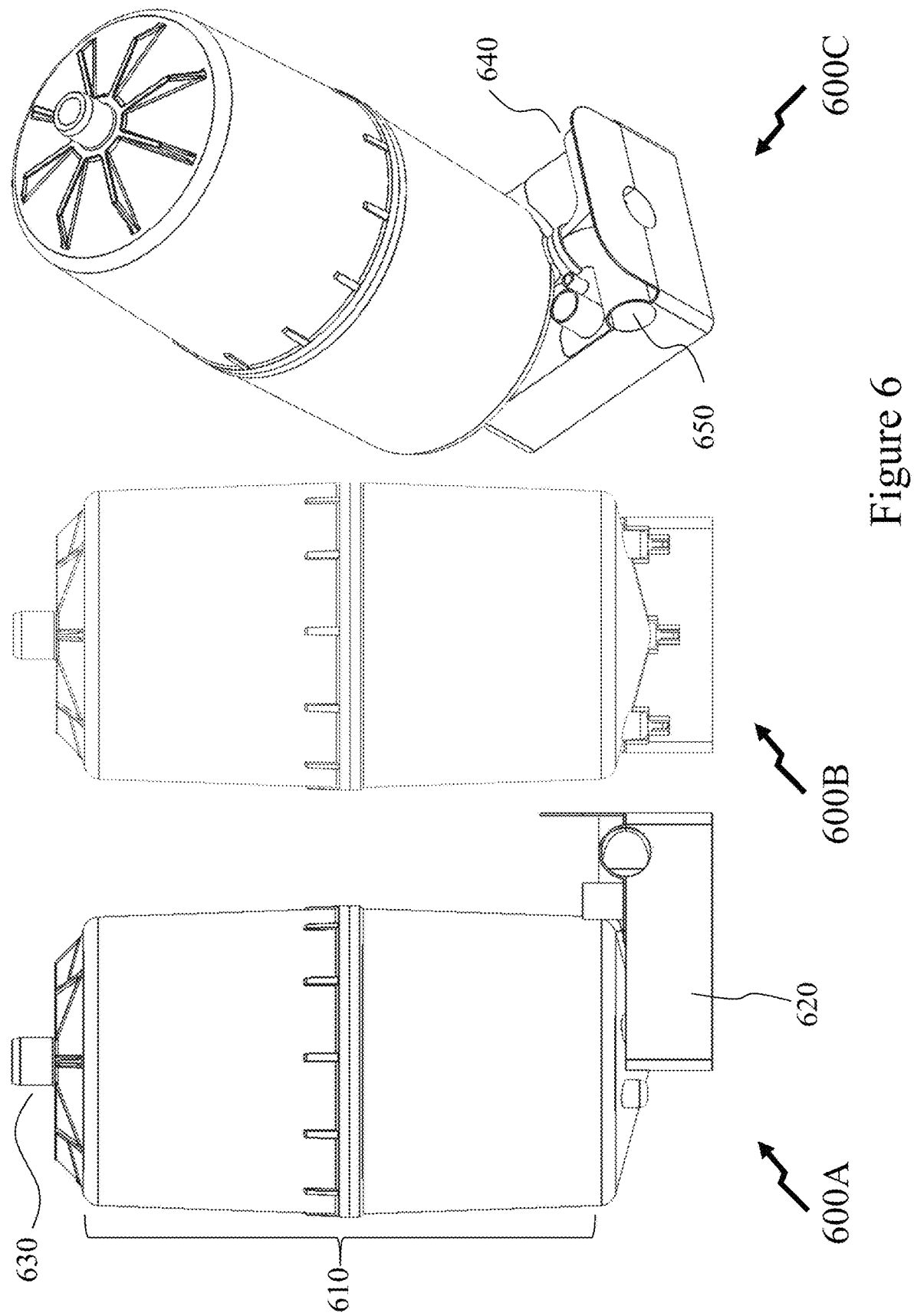
FIG. 6 depicts a mechanism according to an embodiment of the invention for engaging and disengaging a cylinder within a fluidic system.

Now referring to FIG. 6 there are depicted first to third images 600A to 600C relating to a mechanism according to an embodiment of the invention for engaging and disengaging a cylinder within a fluidic system. As depicted a cylinder 610 with an inlet 630 is attached to a base 620 which has inlet/drain connections 640 and 650 respectively. The base 620 may be designed to fit a base element within the humidifier such that the base 620 is slid into the base element and fluidic connections are made to the inlet/drain connections 640 and 650 respectively such as via sliding inner tubes designed to engage the inlet/drain connections 640 and 650 respectively with O-ring seals for example. Such a design being essentially the inverse of the movable sleeve 224 in FIGS. 2A through 3 respectively wherein the inner tube moves relative to a fixed external tube rather than an outer tube moves relative to a fixed internal tube. Base 620 may be retained in position relative to the base element by a mechanical fixture or fixtures. Optionally, the inlet/drain connections 640 and 650 respectively may project outside the footprint of the base 620 allowing a flexible hose to be attached and retained via a hose clamp.

Now referring to FIGS. 7A to 9 there are depicted first to eighth images 700A-700D, 800A-800B, and 900A-900B a mechanism according to an embodiment of the invention for engaging and disengaging a cylinder within a fluidic system. Referring to first and second images 700A and 700B respectively in FIG. 7A there are depicted three-dimensional (3D) perspective views of the mechanism in "closed" (cylinder installed within humidifier) and "open" (where the cylinder has been pivoted forward during installation/removal). Two-dimensional (2D) side elevations of the mechanism in the "open" and "closed" positions are depicted in fifth and sixth images 800A and 800B respectively in FIG. 8. As depicted the cylinder 710 comprises an outlet 720 which engages with steam tube 730 when the cylinder 710 is pivoted into the humidifier. The cylinder 710 being mounted to an inlet-drain assembly 740 which is mounted to base plate 750 via guides 755. Within the 2D side elevation views in FIG. 8 the steam tube 730 is covered by the housing 770.

Figure 7A:
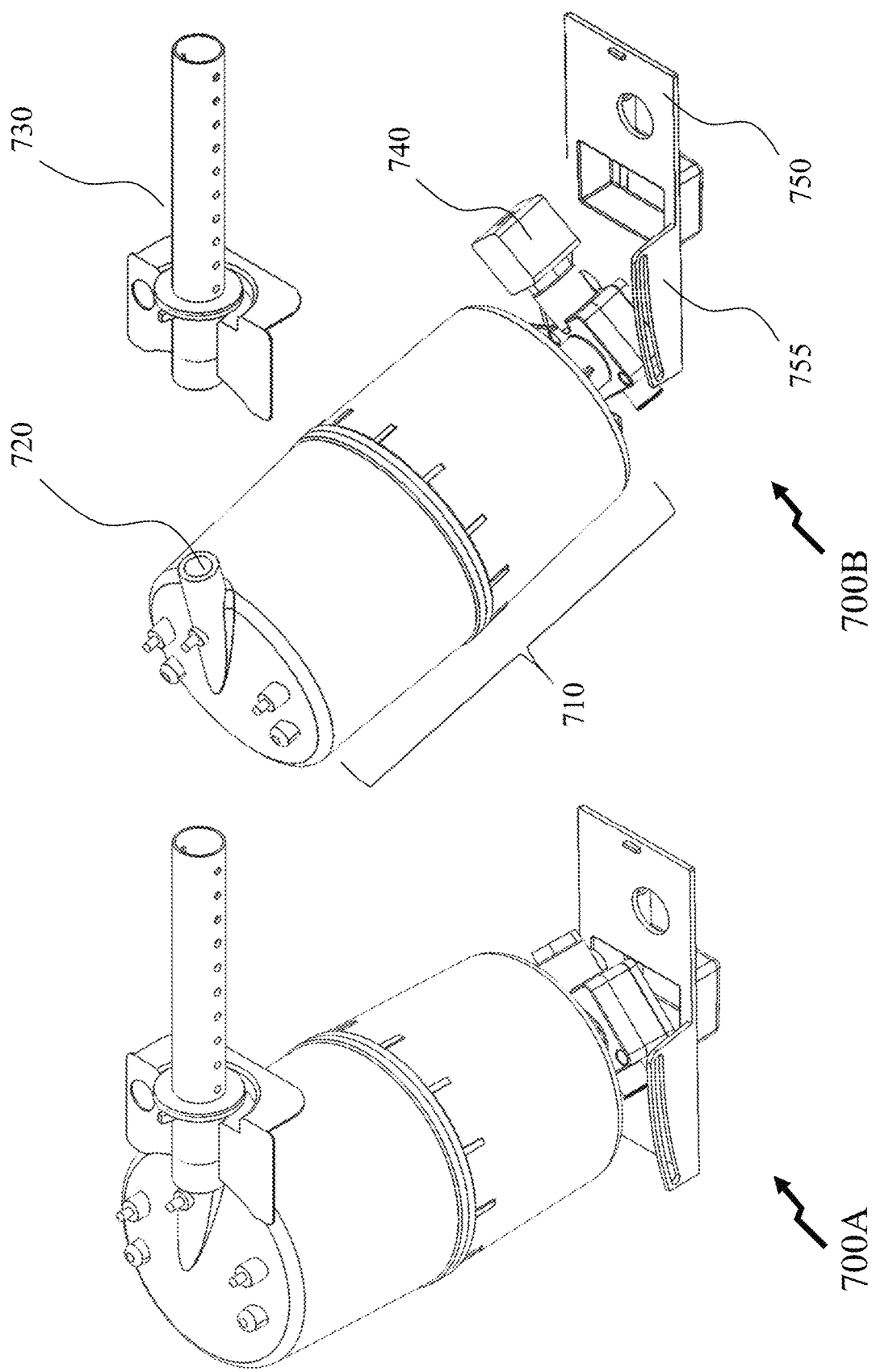
FIGS. 7A to 9 depict a mechanism according to an embodiment of the invention for engaging and disengaging a cylinder within a fluidic system.
Figure 7B:
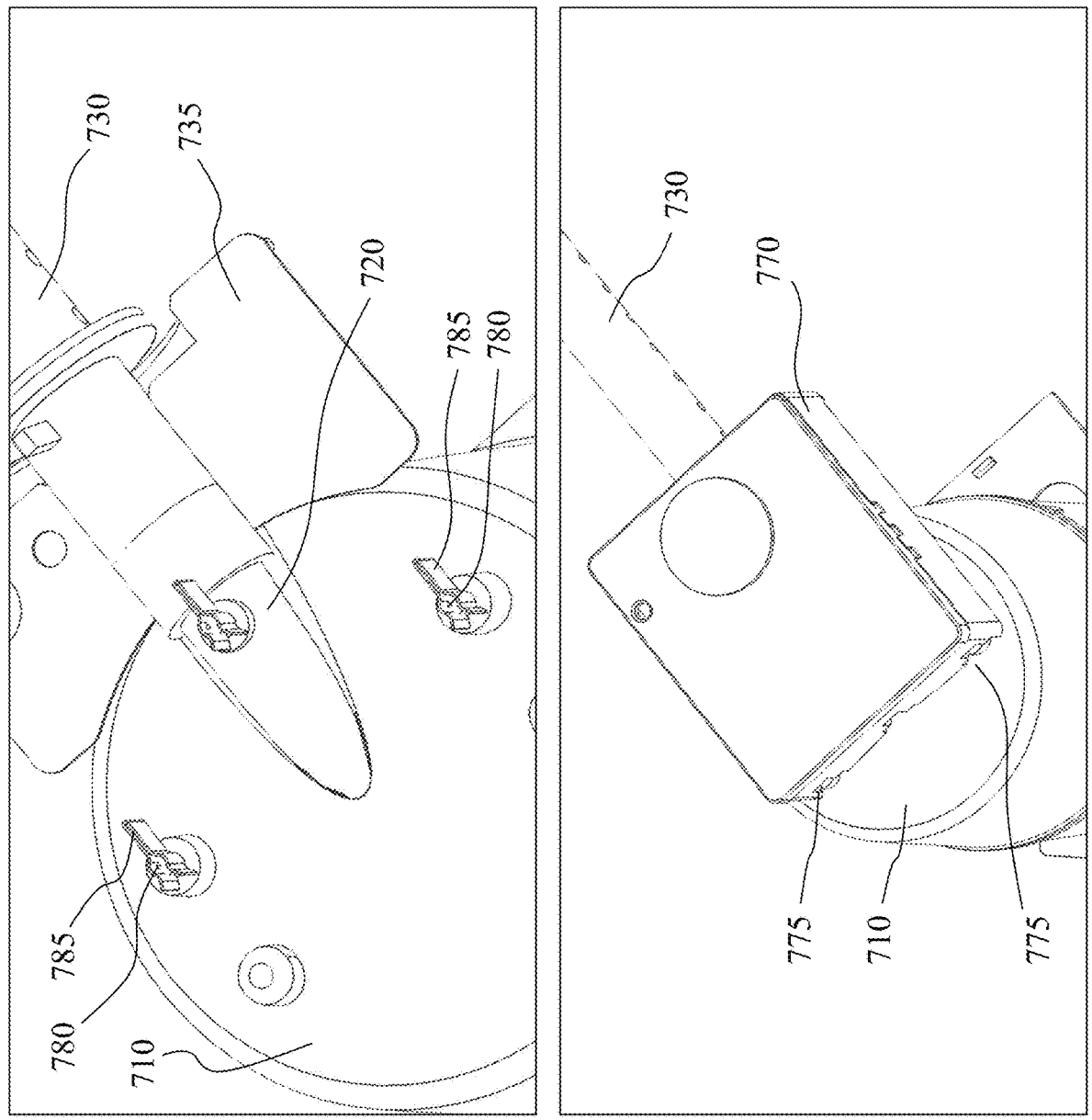
Figure 8:
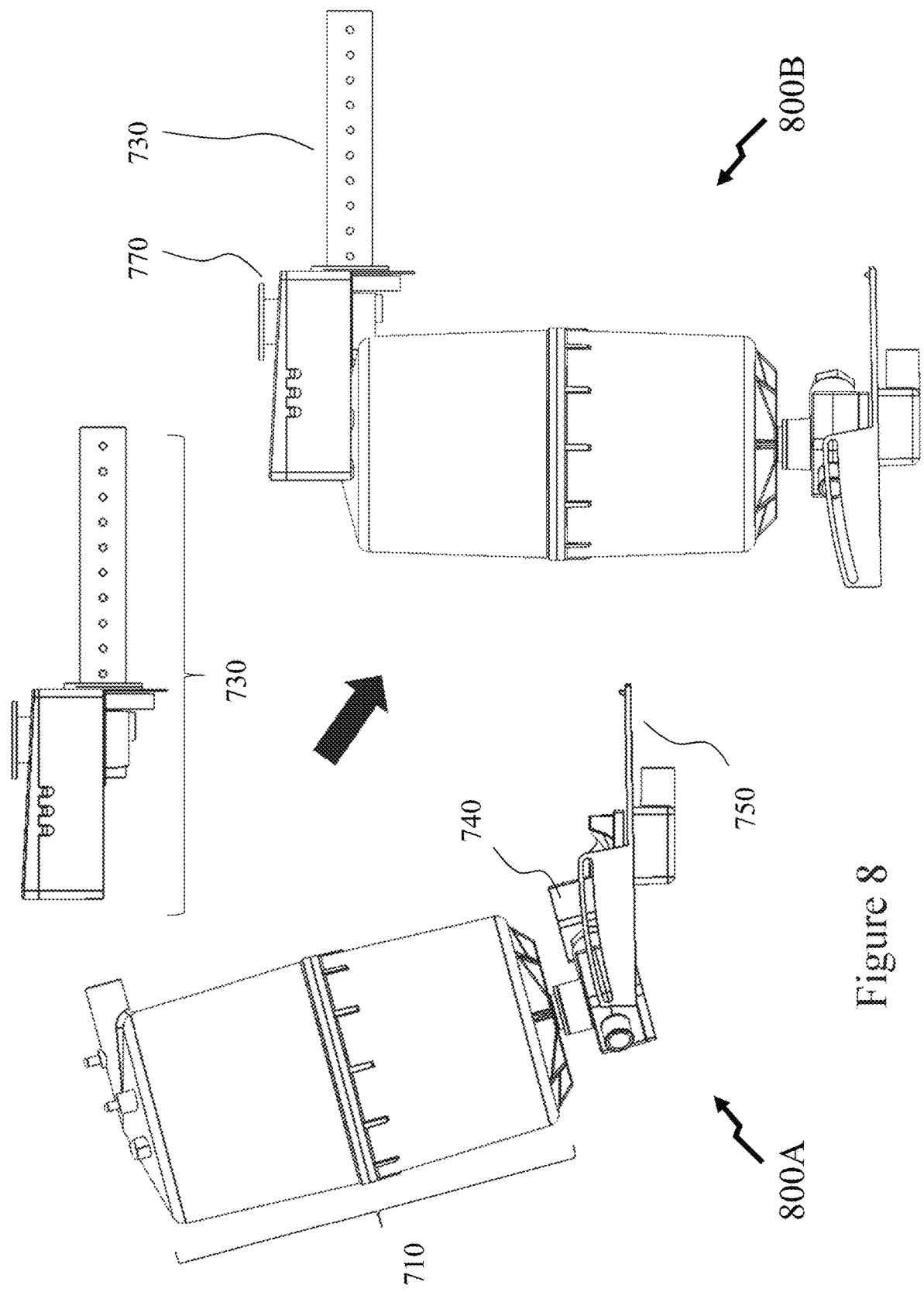

Referring to FIG. 7B there are depicted third and fourth images 700C and 700D respectively 3D perspective views of the mechanism in the "closed" position wherein the cylinder 710 is vertical and the outlet 720 engaged with the steam tube 730. In third image 700C the majority of the housing 770 has been removed except the electrical connectors 785 which engage the electrical feed-throughs 780 through the upper portion of the cylinder 710. Accordingly, as the cylinder is tilted from the "open" to the "closed" position and vice-versa the electrical feed-throughs 780, which connect to electrodes, sensors etc. within the cylinder 710, connect/disconnect respectively with the electrical connectors 785 so that the electrical connections to the cylinder are made concurrently with the fluidic connections. Also visible is a flange 735 of the steam tube 730. Fourth image 700D depicts the upper portion of the mechanism and cylinder 710 with the housing 770 in place wherein access ports 775 are visible at the rear allowing the electrical feed-throughs 780 to move through the wall of the housing 770.

Figure 9:
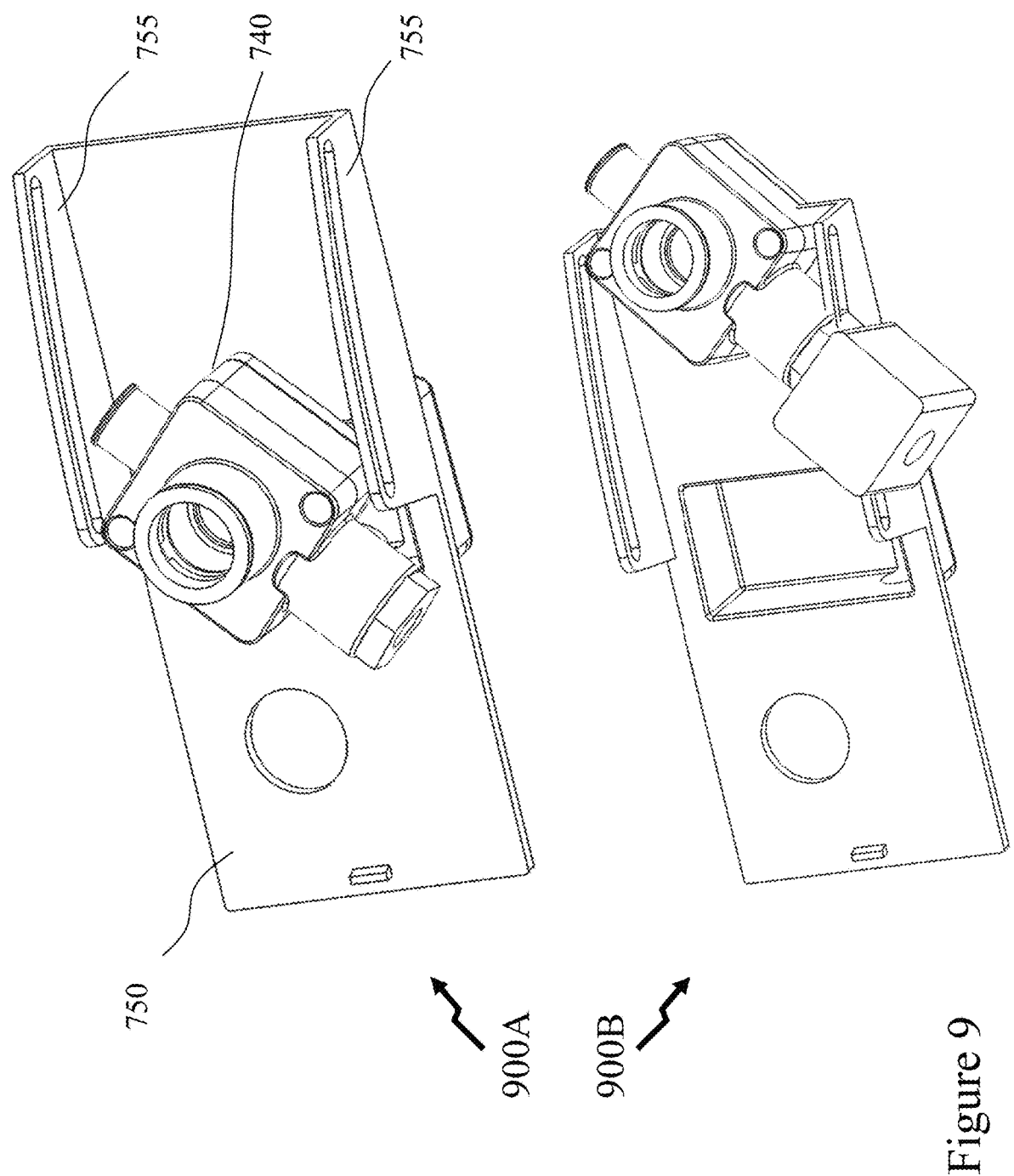

Now referring to FIG. 9 the inlet-drain assembly 740 and base plate 750 are depicted without the cylinder 710 etc. in the "closed" and "open" positions in seventh and eighth images 900A and 900B respectively. Accordingly, as the user pulls/pushes the cylinder the inlet-drain assembly 740 moves along the guides 755 within the base plate 750. Accordingly, to remove a REHUC the user pulls the cylinder 710 which removes the end of the outlet 720 from within the end of the steam tube 730 and allows the cylinder to be lifted away from the humidifier without the humidifier interfering. Hence, to insert a new REHUC the user couples the fluid coupling at the bottom of the cylinder 710 to the inlet-drain assembly 740 and then pushes the cylinder 710 wherein the guides raise and align it with respect to the steam tube 730 to make the output fluid connection.

Figure 10:
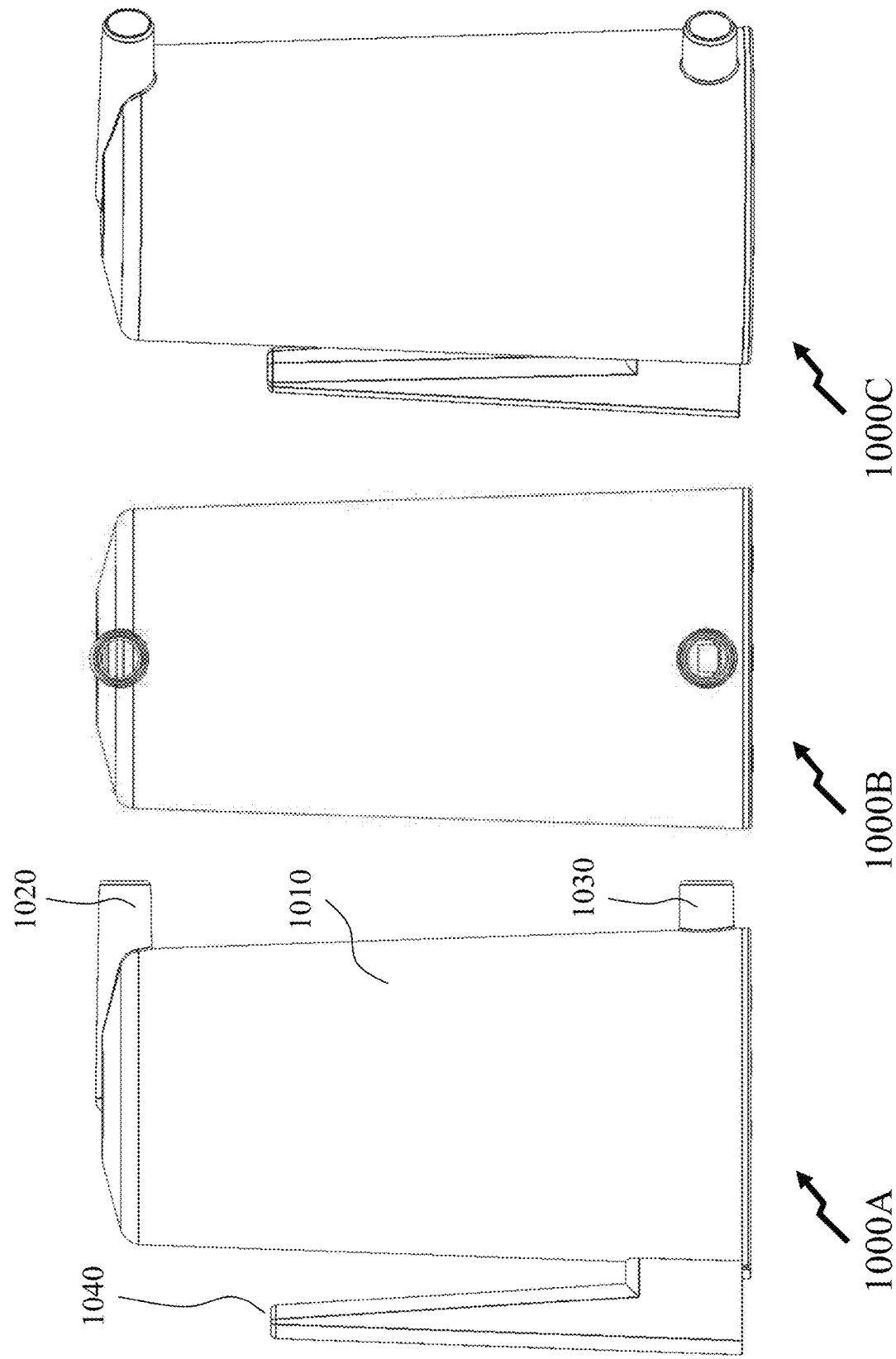
FIG. 10 depicts a mechanism according to an embodiment of the invention for engaging and disengaging a cylinder within a fluidic system.

Referring to FIG. 10 there are depicted first to third images 1000A to 1000C respectively for a mechanism according to an embodiment of the invention for engaging and disengaging a cylinder within a fluidic system. As depicted the cylinder 1010 has first and second fluid couplings 1020 and 1030 respectively together with a handle 1040. Accordingly, the cylinder 1010 may be slid into the humidifier making the fluidic connections or alternatively flexible hoses may be coupled to the first and second fluid couplings 1020 and 1030 respectively and the cylinder 1010 positioned within the humidifier.

Figure 11A:
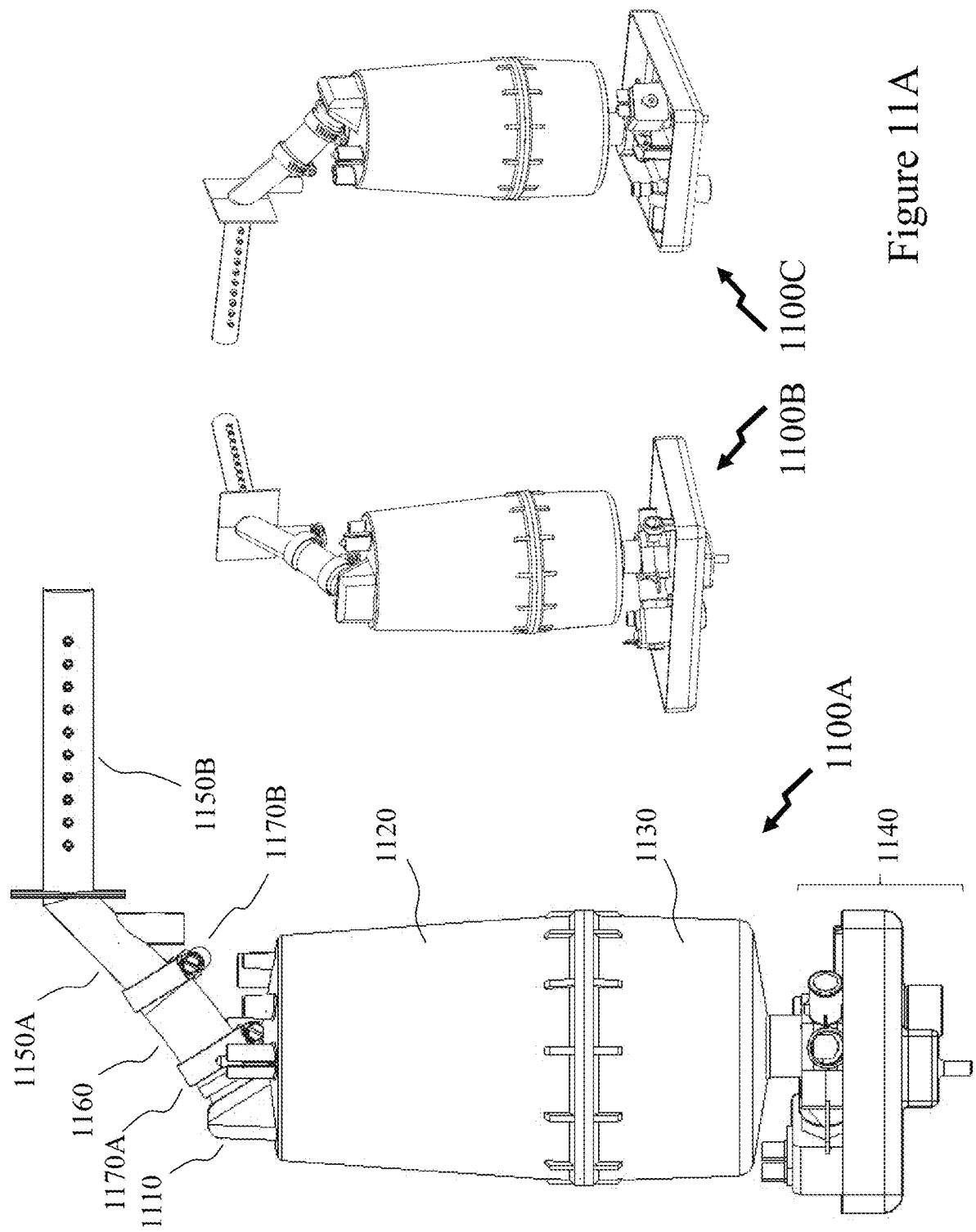

FIGS. 11A to 12B depict a mechanism according to an embodiment of the invention for engaging and disengaging a cylinder within a fluidic system. Referring to FIG. 11A there are depicted first to third images 1100A to 1100C respectively for a REHUC mechanism according to an embodiment of the invention for engaging and disengaging a cylinder within a fluidic system. Accordingly, first image 1100A depicts the REHUC cylinder comprising outlet 1110, upper body portion 1120, lower body portion 1130 and inlet-drain assembly 1140 together with steam tube comprising coupling 1150A and tube 1150B (with a plurality of steam outlets disposed along its length). The steam tube being coupled to the RHUC cylinder via tubing 1160 which is mounted to the outlet 1110 by first attachment 1170A and to the coupling 1150A via second attachment 1170B. Second and third images 1100B and 1100C depict the REHUC mechanism in two different 3D perspective views.

Figure 11B:
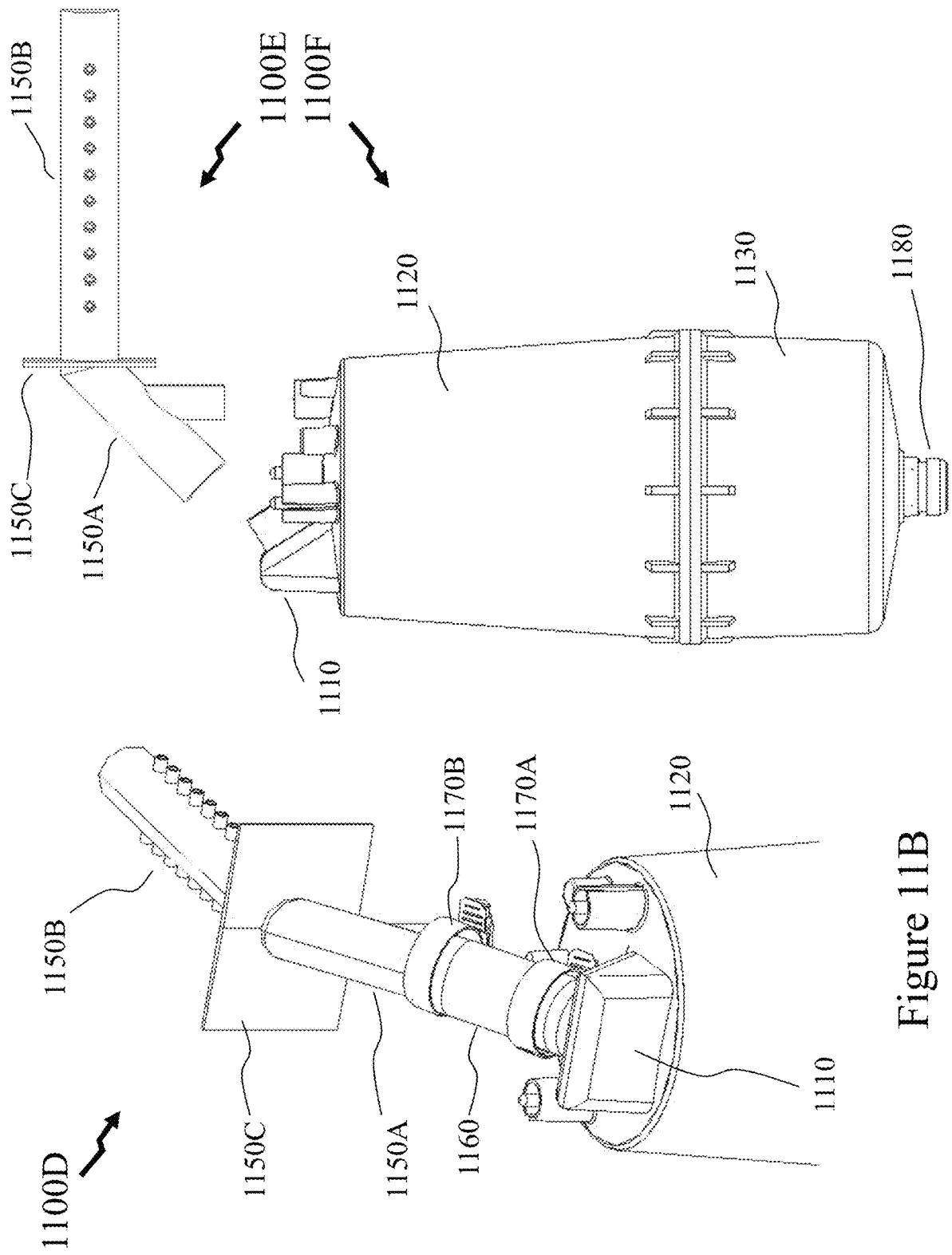

Within FIG. 11B there are depicted first to third images 1100D to 1100F respectively. First image 1100D being a close-up 3D perspective view of the REHUC cylinder outlet and steam tube coupling depicting the upper body portion 1120 of the REHUC cylinder with outlet 1110 together with the injector comprising coupling 1150A, tube 1150B, and abutment plate 1150C. These being joined by tubing 1160 which is mounted to the outlet 1110 by first attachment 1170A and to the coupling 1150A via second attachment 1170B. Second image 1100E depicts the injector in isolation comprising coupling 1150A, tube 1150B, and abutment plate 1150C whilst third image 1100C depicts the REHUC cylinder comprising outlet 1110, upper body portion 1120, lower boy portion 1130 and inlet 1180. The inlet 1180 coupling to the inlet-drain assembly 1140 when the REHUC cylinder is mounted to it and positioned.

Referring to FIG. 12A first and second image 1200A and 1200B depict 3D perspective views of the lower portion of the assembly. First image 1200A comprising inlet-drain assembly and REHUC cylinder coupled together whilst second image 1200B depicts only the inlet-drain assembly. In first image 1200A the REHUC cylinder is depicted only by lower body portion 1120 whereas the inlet-drain assembly comprises a tray 1140E, a first mounting 1140A, a fluidic coupler 1140C and valve controller 1140D. In second image 1200B these are also depicted together with second mounting 1140B and inlet receptacle 1140F. The inlet receptacle 1140F being dimensioned to fit around the outer diameter of the inlet of the REHUC cylinder when it is inserted. Fluid (e.g. water) flow into the REHUC cylinder from the source, e.g. water reservoir, during vapour fluid generation (operation of REHUC) or cleaning cycles and fluid flow from the REHUC cylinder during a drain sequence of a cleaning cycle or REHUC removal being via the fluidic coupler 1140C which is controlled via valve controller 1140D. The fluidic coupler 1140C receiving fluid from external fluid system via controller inlet port 1140G wherein it is coupled to the inlet receptacle 1140F and therein the inlet 1180 of the REHUC cylinder when mounted under the control of the valve controller 1140D. The fluidic coupler 1140C also draining fluid from the REHUC cylinder via the inlet receptacle 1140F under the control of the valve controller 1140D wherein the fluid being drained is directed to drain 1140I of the tray 1140E via controller outlet port 1140H.

Figure 12B:
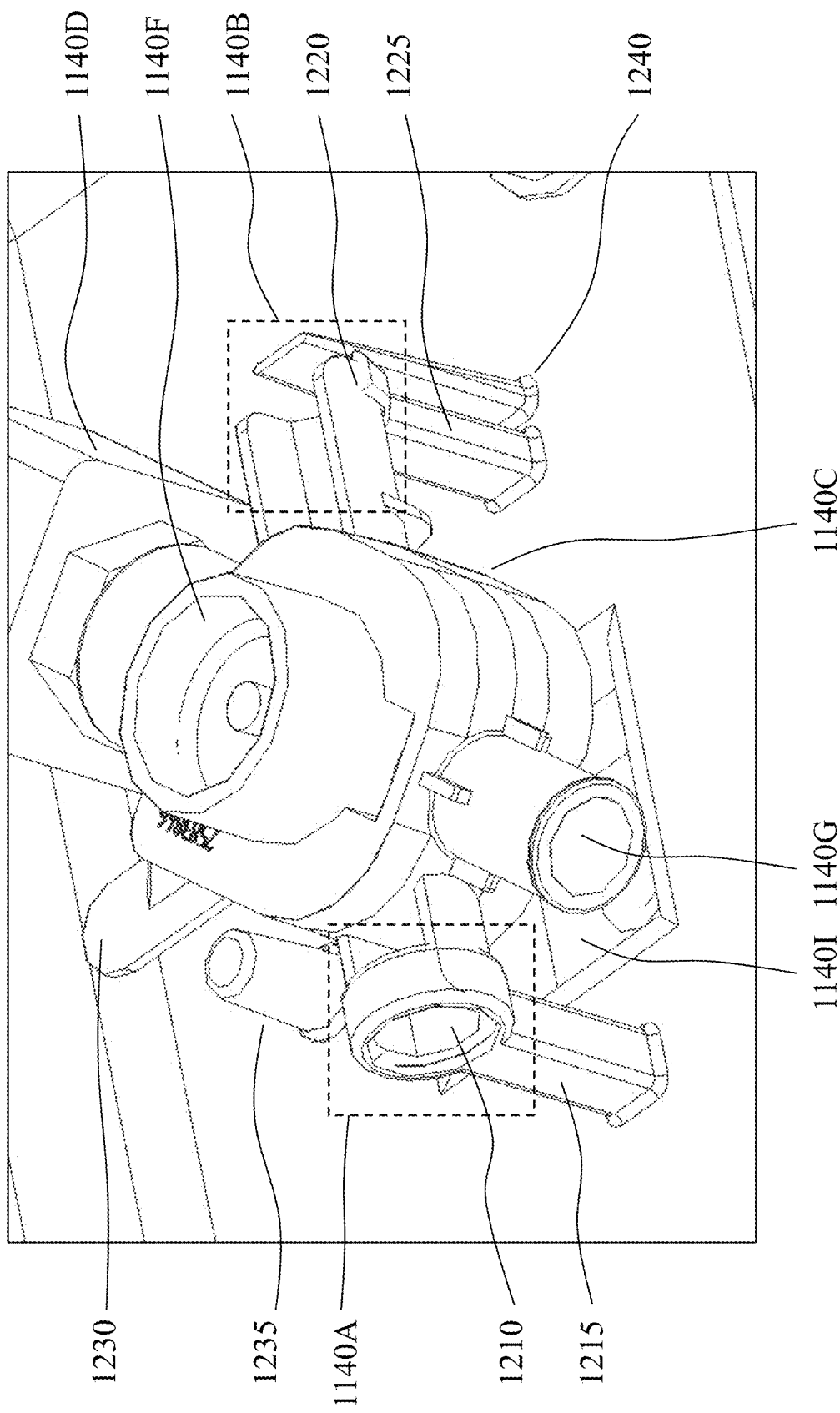

Referring to FIG. 12B there is depicted a 3D perspective view of the inlet-drain assembly depicting the controller inlet port 1140G, drain 1140I, inlet receptacle 1140F, valve controller 1140D, fluidic coupler 1140C as described and depicted in FIG. 12A. Also depicted are first mounting 1140A, which comprises first coupler mount 1210 and first support 1215, and second mounting 1140B, which comprises second coupler mount 1220 and second support 1225. The first and second supports 1215 and 1225 being attached to the tray and allowing insertion/retention of the assembly (comprising controller inlet port 1140G, inlet receptacle 1140F, valve controller 1140D, fluidic coupler 1140C etc. to the tray) as well as rotation of the assembly relative to the tray. Accordingly, the assembly is vertically and laterally positioned by the heights of the first and second supports 1215 and 1225 and laterally restrained by flexible support 1240 which is pushed aside as the assembly is lowered and slid into first mounting 1140A. Rotation of the assembly with respect to the tray is prevented in one direction by arm 1230 on the fluidic coupler 1140C engaging stop 1235 on the base of the tray. Accordingly, the assembly can rotate in one direction.

At initial installation of the REHUC cylinder the assembly is rotated away from substantially parallel to the tray, the REHUC cylinder mounted such that the inlet 1180 is within the inlet receptacle 1140F, and then the assembly with REHUC cylinder rotated till the arm 1230 engages the stop 1235. Once in this position the tubing 1160 is attached to the outlet 1110 of the REHUC cylinder by first attachment 1170A and to the coupling 1150A of the injector by second attachment 1170B. Subsequently, when the REHUC cylinder is to be removed and a replacement fitted, then the first and second attachments 1170A and 1170B are undone, the tubing 1160 removed and then the REHUC cylinder can be pivoted upon the assembly away such that the REHUC cylinder can be removed without potential impact to the injector.

Figure 13A:
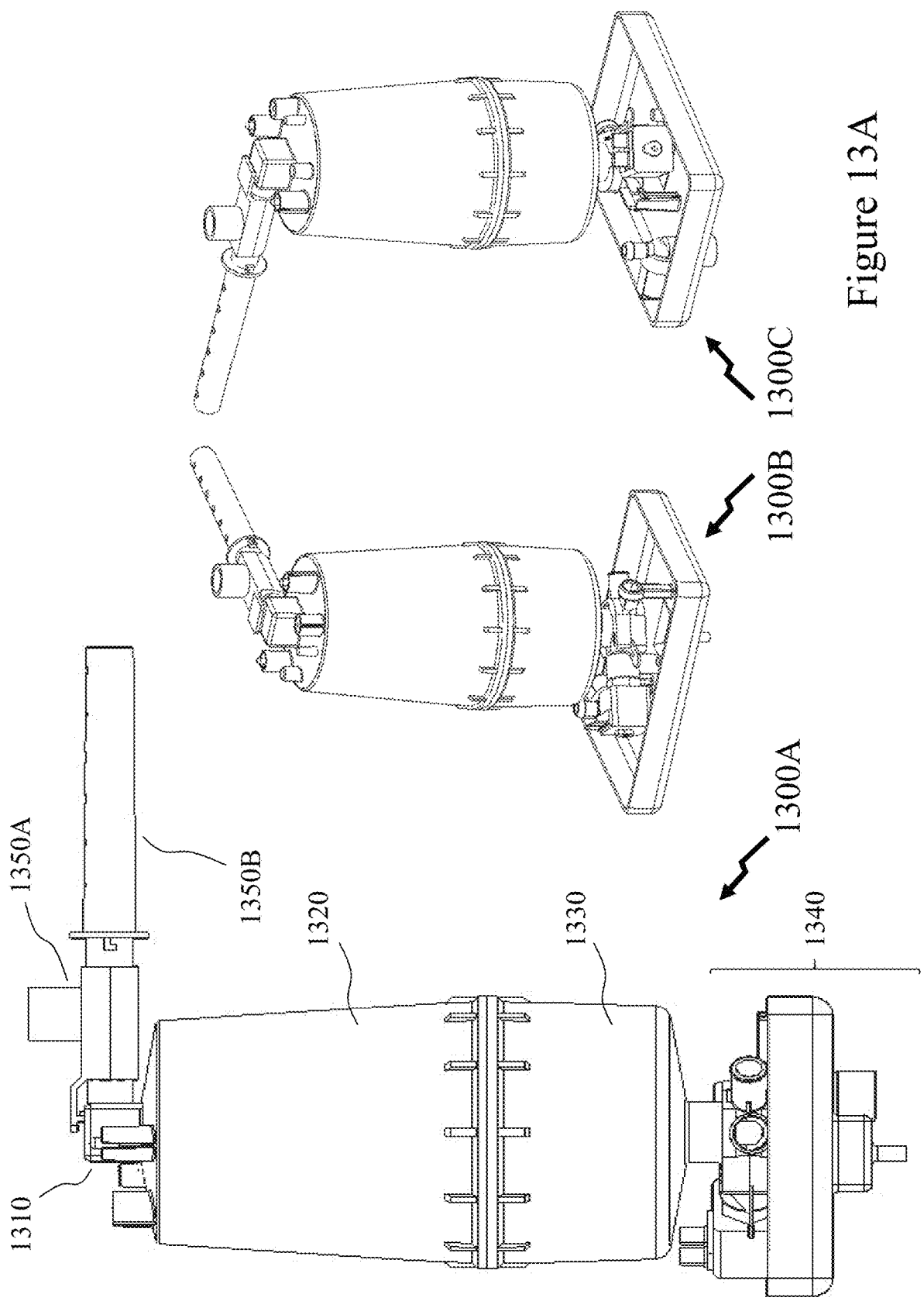
Figure 13B:
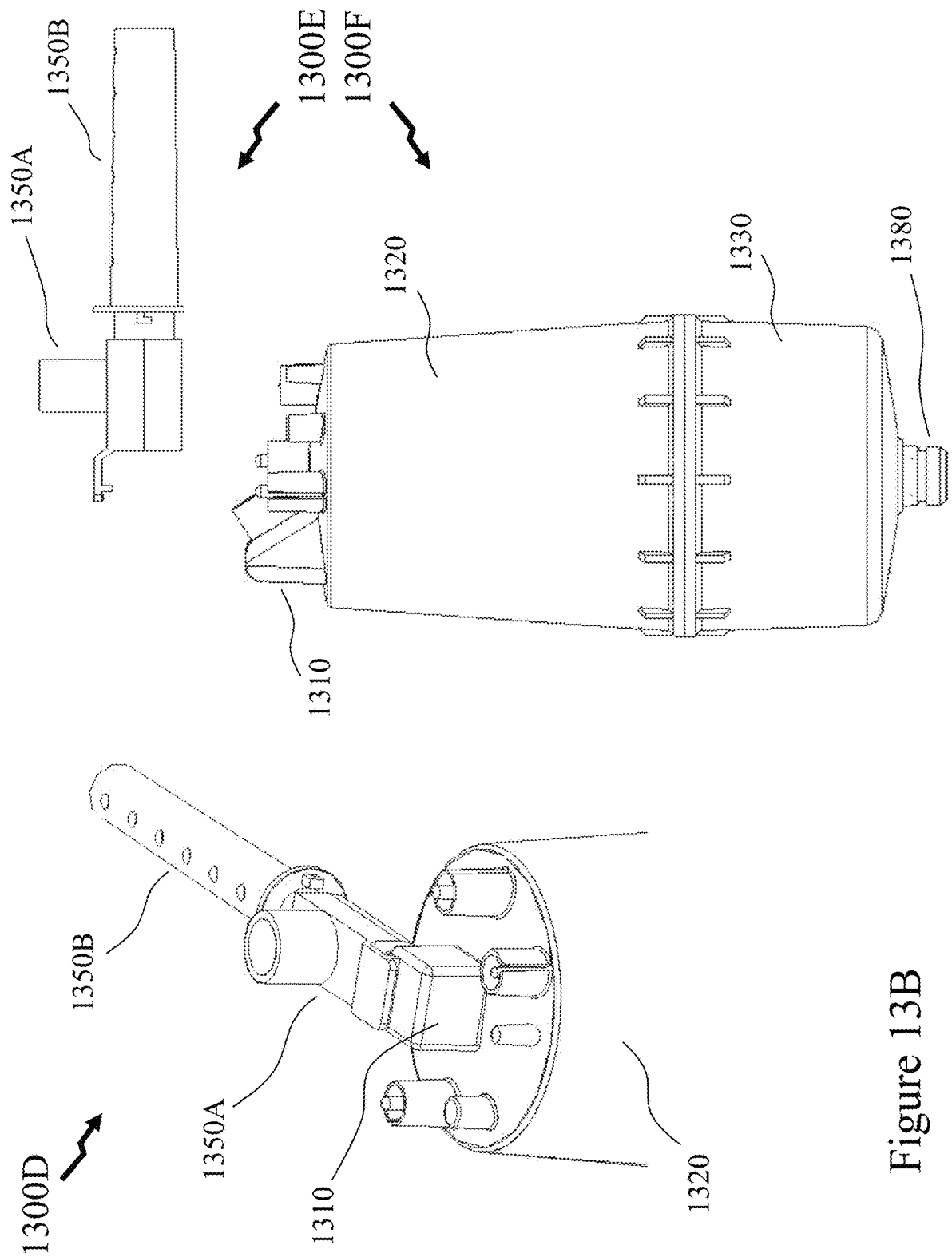

Now referring to FIGS. 13A and 13B there is depicted a mechanism according to an embodiment of the invention for engaging and disengaging a cylinder within a fluidic system. Referring to FIG. 13A there are depicted first to third images 1300A to 1300C respectively for a REHUC mechanism according to an embodiment of the invention for engaging and disengaging a cylinder within a fluidic system. Accordingly, first image 1300A depicts the REHUC cylinder comprising outlet 1310, upper body portion 1320, lower body portion 1330 and inlet-drain assembly 1340 together with steam tube comprising coupling 1350A and tube 1350B (with a plurality of steam outlets disposed along its length). The steam tube being coupled to the RHUC cylinder outlet 1310 directly rather than via a tubing 1160 in FIGS. 11A and 11B respectively. Second and third images 1300B and 1300C depict the REHUC mechanism in two different 3D perspective views.

Within FIG. 13B there are depicted first to third images 1300D to 1300F respectively. First image 1300D being a close-up 3D perspective view of the REHUC cylinder outlet and steam tube coupling depicting the upper body portion 1320 of the REHUC cylinder with outlet 1310 together with the injector comprising coupling 1350A and tube 1350B. Second image 1300E depicts the injector in isolation comprising coupling 1350A and tube 1350B whilst third image 1300F depicts the REHUC cylinder comprising outlet 1310, upper body portion 1320, lower body portion 1330 and inlet 1380. The inlet 1380 coupling to the inlet-drain assembly 1340 when the REHUC cylinder is mounted to it and positioned.

Referring to FIG. 14A first and second image 1400A and 1400B depict 3D perspective views of the lower portion of the assembly. First image 1400A comprising inlet-drain assembly and REHUC cylinder coupled together whilst second image 1400B depicts only the inlet-drain assembly. In first image 1400A the REHUC cylinder is depicted only by lower body portion 1320 whereas the inlet-drain assembly comprises a tray 1340E, a first mounting 1340A, a fluidic coupler 1340C and valve controller 1340D. In second image 1400B these are also depicted together with second mounting 1340B and inlet receptacle 1340F. The inlet receptacle 1340F being dimensioned to fit around the outer diameter of the inlet of the REHUC cylinder when it is inserted. Fluid (e.g. water) flow into the REHUC cylinder from the source, e.g. water reservoir, during vapour fluid generation (operation of REHUC) or cleaning cycles and fluid flow from the REHUC cylinder during a drain sequence of a cleaning cycle or REHUC removal being via the fluidic coupler 1340C which is controlled via valve controller 1340D. The fluidic coupler 1340C receiving fluid from external fluid system via controller inlet port 1340G wherein it is coupled to the inlet receptacle 1340F and therein the inlet 1380 of the REHUC cylinder when mounted under the control of the valve controller 1340D. The fluidic coupler 1340C also draining fluid from the REHUC cylinder via the inlet receptacle 1340F under the control of the valve controller 1340D wherein the fluid being drained is directed to drain 1340I of the tray 1340E via controller outlet port 1340H.

Figure 14B:
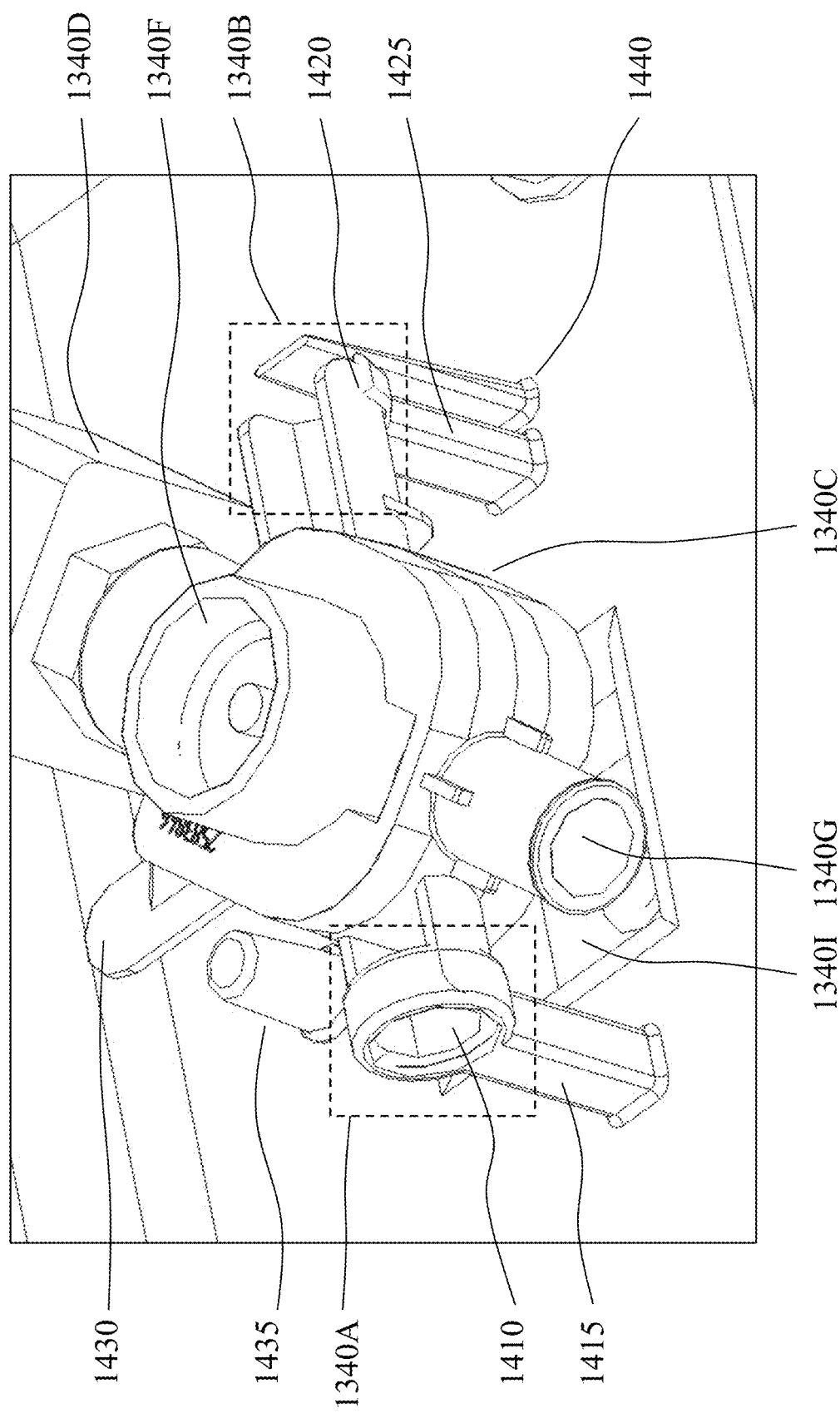

Referring to FIG. 14B there is depicted a 3D perspective view of the inlet-drain assembly depicting the controller inlet port 1340G, drain 1340I, inlet receptacle 1340F, valve controller 1340D, fluidic coupler 1340C as described and depicted in FIG. 14A. Also depicted are first mounting 1340A, which comprises first coupler mount 1410 and first support 1415, and second mounting 1340B, which comprises second coupler mount 1420 and second support 1425. The first and second supports 1415 and 1425 being attached to the tray and allowing insertion/retention of the assembly (comprising controller inlet port 1340G, inlet receptacle 1340F, valve controller 1340D, fluidic coupler 1340C etc. to the tray) as well as rotation of the assembly relative to the tray. Accordingly, the assembly is vertically and laterally positioned by the heights of the first and second supports 1415 and 1425 and laterally restrained by flexible support 1440 which is pushed aside as the assembly is lowered and slid into first mounting 1340A. Rotation of the assembly with respect to the tray is prevented in one direction by arm 1430 on the fluidic coupler 1340C engaging stop 1435 on the base of the tray. Accordingly, the assembly can rotate in one direction.

At initial installation of the REHUC cylinder the assembly is rotated away from substantially parallel to the tray, the REHUC cylinder mounted such that the inlet 1380 is within the inlet receptacle 1340F, and then the assembly with REHUC cylinder rotated till the arm 1430 engages the stop 1435. As the REHUC cylinder and assembly are rotated the outlet 1310 of the REHUC cylinder engages the coupling 1350A of the injector. Subsequently, when the REHUC cylinder is to be removed and a replacement fitted, then the REHUC cylinder can be pivoted upon the assembly away such that the REHUC cylinder can be removed without potential impact to the injector. Accordingly, the outlet 1310 automatically engages and disengages the coupling 1350A of the injector as the REHUC cylinder and assembly are pivoted in contrast to the configuration depicted in FIGS. 11A to 12B wherein the connection from the outlet 1110 of the REHUC cylinder to the coupling 1150A of the injector must be physically made/unmade when the REHUC cylinder is in the correct position.

It would be evident that in each assembly configuration depicted within FIGS. 2A to 14B with each instance of removal-installation electrical connections are made/unmade which are not explicitly described with respect to embodiments of the invention. These electrical connections can include, but are not limited to, heating element(s), temperature sensor(s), fluid level sensor(s), etc. Within embodiments of the invention these electrical connections may be made discretely one by one, all at once through a connector, in subsets through multiple connectors. Within embodiments of the invention these may be connected/disconnected as a separate step to that of the fluidic connections in the removal/installation process or they may be made concurrently through appropriate electrical connectors supporting insertion/removal of a plug or socket from a socket or plug which may have retention elements that can be engaged/disengaged to allow removal/insertion and maintenance of electrical connections during use.

Whilst the cylinders depicted in respect of FIGS. 2A to 14B are circular in external geometry at the base it would be evident that other external geometries may be employed including, but not limited to, square, rectangular, hexagonal, and octagonal or a combination thereof. For example, a predominantly circular external geometry may be merged with a square geometry such that edges of the square engage with features within the humidifier aligning the cylinder with the humidifier. Alternatively, such features aligning the cylinder with the humidifier may be disposed further up the body of the cylinder.

Whilst the cylinders described and depicted in respect of FIGS. 2A to 14B exploit a single inlet-drain connection and a single outlet it would be evident to one of skill in the art that multiple inlets and/or outlets may be employed without departing from the scope of the invention. For example, a single fluid inlet may be employed, e.g. for water, with a steam outlet port and a second outlet port for draining.

Whilst the cylinders and embodiments of the invention described and depicted in respect of FIGS. 2A to 14B relate to humidification systems it would be evident to one skilled in the art that the concepts may be applied to a variety of other fluid processing and/or fluid management systems including replaceable filters for water purification systems, air conditioning systems, chemical treatments, dehumidification systems, electrostatic purification systems, ultraviolet purification systems, refrigeration systems, chemical systems, heating systems, air conditioning systems, filtering systems, electrical humidifiers, ultrasonic humidifiers, etc.

It would be evident to one skilled in the art that the body of the cylinders, inlet port(s), outlet port(s), connectors, fluidic assemblies, system casing, connectors, etc. may be formed from one or more plastics, metals, alloys, glasses etc. according to the functionality of the cylinder, the fluid(s) coupled to the cylinder, the fluid(s) coupled from the cylinder, operating temperature etc.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:
1. A device comprising:
  a first fluidic assembly for coupling to a first fluid port of a replaceable cylinder for at least one of providing and receiving a first fluid to the cylinder;
  a second fluidic assembly for coupling to a second fluid port for receiving a second fluid from a second fluid port of the replaceable cylinder; wherein
  the first fluidic assembly comprises:
    a coupling for mating to the first fluid port; and
    a mounting for coupling the first fluidic assembly to a support within a system of which the replaceable cylinder forms part;
  the mounting and support allow the first fluidic assembly to tilt such that at least one of the second fluid port of the replaceable cylinder can be tilted away from the second fluidic assembly to allow the replaceable cylinder to be removed or the second fluid port of the replaceable cylinder can be tilted towards the second fluidic assembly after the replaceable cylinder has been mounted to the first fluidic assembly for installation; and
  when mounted to the mounting the second fluid port of the replaceable cylinder is at least one of disconnected from the second fluidic assembly by tilting the replaceable cylinder and mounting such that the second fluid port of the replaceable cylinder is moved away from and disconnects with the second fluid assembly and connected to the second fluidic assembly by tilting the replaceable cylinder and mounting such that the second fluid port of the replaceable cylinder is moved towards and connects with the second fluidic assembly.
2. A device comprising:
  a first fluidic assembly for coupling to a first fluid port of a replaceable cylinder for providing a first fluid to the cylinder; wherein the first fluidic assembly comprises:
a coupling for mating to the first fluid port; and
a mounting for coupling the first fluidic assembly to a support within a system of which the replaceable cylinder forms part;
the mounting and support allow the first fluidic assembly to tilt such that at least one of a second fluid port of the replaceable cylinder can be tilted away from a second fluidic assembly to allow the replaceable cylinder to be removed and the second fluid port of the replaceable cylinder can be tilted towards the second fluidic assembly after the replaceable cylinder has been mounted to the first fluidic assembly for installation;
tilting of the second fluid port of the replaceable cylinder at least one of away from the second fluidic assembly disconnects the second fluid port of the replaceable cylinder from the second fluidic assembly and towards the second fluidic assembly connects the second fluid port of the replaceable cylinder to the second fluidic assembly; and
the second fluidic assembly for receiving a second fluid from the second fluid port of the replaceable cylinder.

3. A device comprising:
a first fluidic assembly for coupling to a first fluid port of a replaceable cylinder for at least one of providing and receiving a first fluid to the cylinder; and
a second fluidic assembly for coupling to a second fluid port for receiving a second fluid from a second fluid port of the replaceable cylinder; wherein
the first fluidic assembly comprises:
a coupling for mating to the first fluid port; and
a mounting for coupling the first fluidic assembly to a support within a system of which the replaceable cylinder forms part;
the mounting and support allow the first fluidic assembly to tilt such that at least one of the second fluid port of the replaceable cylinder can be tilted away from the second fluidic assembly to allow the replaceable cylinder to be removed or the second fluid port of the replaceable cylinder can be tilted towards the second fluidic assembly after the replaceable cylinder has been mounted to the first fluidic assembly for installation;
tilting of the second fluid port of the replaceable cylinder at least one of away from the second fluidic assembly to disconnect the second fluid port of the replaceable cylinder from the second fluidic assembly and towards the second fluidic assembly to connect the second fluid port of the replaceable cylinder;
the mounting and support allow the first fluidic assembly to tilt such that at least one of the second fluid port of the replaceable cylinder can be tilted away from the second fluidic assembly to allow the replaceable cylinder to be removed or the second fluid port of the replaceable cylinder can be tilted towards the second fluidic assembly after the replaceable cylinder has been mounted to the first fluidic assembly for installation;
when mounted to the mounting the second fluid port of the replaceable cylinder is at least one of disconnected from the second fluidic assembly by tilting the replaceable cylinder and mounting such that the second fluid port of the replaceable cylinder is moved away from and disconnects with the second fluidic assembly and connected to the second fluidic assembly by tilting the replaceable cylinder and mounting such that the second fluid port of the replaceable cylinder is moved towards and connects with the second fluidic assembly;
disconnecting the second fluid port of the replaceable cylinder from the second fluidic assembly automatically disconnects at least one electrical connection of a plurality of electrical connections to the replaceable cylinder; and
connecting the second fluid port of the replaceable cylinder to the second fluidic assembly automatically connects the at least one electrical connection of the plurality of electrical connections to the replaceable cylinder.

4. A device comprising:
a first fluidic assembly for coupling to a first fluid port of a replaceable cylinder for at least one of providing and receiving a first fluid to the cylinder; and
a second fluidic assembly for coupling to a second fluid port for receiving a second fluid from a second fluid port of the replaceable cylinder
wherein the first fluidic assembly comprises:
a coupling for mating to the first fluid port; and
a mounting for coupling the first fluidic assembly to a support within a system of which the replaceable cylinder forms part; wherein
the mounting and support allow the first fluidic assembly to tilt such that at least one of the second fluid port of the replaceable cylinder can be tilted away from the second fluidic assembly to allow the replaceable cylinder to be removed or the second fluid port of the replaceable cylinder can be tilted towards the second fluidic assembly after the replaceable cylinder has been mounted to the first fluidic assembly for installation;
the second fluidic assembly is automatically aligned and coupled to the second fluid port of the replaceable cylinder when the replaceable cylinder is moved towards the second fluidic assembly by tilting the replaceable cylinder and mounting in a first direction;
the second fluidic assembly is automatically decoupled from the second fluid port of the replaceable cylinder when the replaceable cylinder is moved away from the second fluidic assembly by tilting the replaceable cylinder and mounting in a second direction; and
the second fluidic assembly is automatically aligned and coupled to the second fluid port of the replaceable cylinder and automatically decoupled from the second fluid port of the replaceable cylinder solely by the tilting of the replaceable cylinder and mounting.

5. A device comprising:
a first fluidic assembly for coupling to a first fluid port of a replaceable cylinder for at least one of providing and receiving a first fluid to the cylinder; and
a second fluidic assembly for coupling to a second fluid port for receiving a second fluid from a second fluid port of the replaceable cylinder
the first fluidic assembly comprises:
a coupling for mating to the first fluid port; and
a mounting for coupling the first fluidic assembly to a support within a system of which the cylinder forms part; wherein
the mounting and support allow the first fluidic assembly to tilt such that at least one of the second fluid port of the replaceable cylinder can be tilted away from the second fluidic assembly to allow the replaceable cylinder to be removed or the second fluid port of the replaceable cylinder can be tilted towards the second fluidic assembly after the replaceable cylinder has been mounted to the first fluidic assembly for installation;
the second fluidic assembly is automatically aligned and coupled to the second fluid port of the replaceable cylinder when the replaceable cylinder is moved towards the second fluidic assembly by tilting the replaceable cylinder and mounting in a first direction;

the second fluidic assembly is automatically decoupled from the second fluid port of the replaceable cylinder when the replaceable cylinder is moved away from the second fluidic assembly by tilting the replaceable cylinder and mounting in a second direction;

the second fluidic assembly is automatically aligned and coupled to the second fluid port of the replaceable cylinder and automatically decoupled from the second fluid port of the replaceable cylinder solely by the tilting of the replaceable cylinder and mounting;

disconnecting the second fluid port of the replaceable cylinder from the second fluidic assembly automatically disconnects at least one electrical connection of a plurality of electrical connections to the replaceable cylinder; and connecting the second fluid port of the replaceable cylinder to the second fluidic assembly automatically connects the at least one electrical connection of the plurality of electrical connections to the replaceable cylinder.

6. A device comprising:

a first fluidic assembly for coupling to a first fluid port of a replaceable cylinder for providing a first fluid to the cylinder; wherein the first fluidic assembly comprises a mounting and a support that allow the first fluidic assembly to tilt such that at least one of a second fluid port of the replaceable cylinder can be tilted away from a second fluidic assembly to allow the replaceable cylinder to be removed and the second fluid port of the replaceable cylinder can be tilted towards the second fluidic assembly after the replaceable cylinder has been mounted to the first fluidic assembly for installation;

tilting of the second fluid port of the replaceable cylinder at least one of away from the second fluidic assembly disconnects the second fluid port of the replaceable cylinder from the second fluidic assembly and towards the second fluidic assembly connects the second fluid port of the replaceable cylinder to the second fluidic assembly;

disconnecting the second fluid port of the replaceable cylinder from the second fluidic assembly automatically disconnects at least one electrical connection of a plurality of electrical connections to the replaceable cylinder;

connecting the second fluid port of the replaceable cylinder to the second fluidic assembly automatically connects the at least one electrical connection of the plurality of electrical connections to the replaceable cylinder; and the second fluidic assembly for receiving a second fluid from the second fluid port of the replaceable cylinder.

* * * * *